United States Patent [19]
Kotani et al.

[11] Patent Number: 5,386,263
[45] Date of Patent: Jan. 31, 1995

[54] METHOD AND APPARATUS FOR RANGEFINDING

[75] Inventors: Takaaki Kotani; Seiji Takada, both of Tokyo; Shigenori Goto; Tatsuo Saito, both of Saitama, all of Japan

[73] Assignee: Fuji Photo Film Co., Ltd., Kanagawa, Japan

[21] Appl. No.: 157,436

[22] Filed: Nov. 26, 1993

Related U.S. Application Data

[63] Continuation of Ser. No. 779,882, Oct. 21, 1991.

[30] Foreign Application Priority Data

| | | | |
|---|---|---|---|
| Oct. 20, 1990 | [JP] | Japan | 2-282920 |
| Nov. 14, 1990 | [JP] | Japan | 2-307976 |
| Dec. 14, 1990 | [JP] | Japan | 2-410843 |
| Dec. 17, 1990 | [JP] | Japan | 2-411155 |

[51] Int. Cl.⁶ .......................... G03B 3/00; G03B 13/18
[52] U.S. Cl. ..................................... 354/403; 354/410; 354/412
[58] Field of Search .................... 354/403, 410, 412

[56] References Cited

U.S. PATENT DOCUMENTS

| | | | |
|---|---|---|---|
| 3,906,389 | 9/1975 | Matsumoto et al. | 354/403 |
| 4,300,824 | 11/1981 | Tokuda et al. | 354/403 X |
| 4,429,967 | 2/1984 | Tokuda et al. | 354/403 |
| 4,760,419 | 7/1988 | Fujiwara et al. | 354/403 |
| 4,935,613 | 6/1990 | Ishiguro et al. | 354/403 X |
| 4,983,033 | 1/1991 | Suzuki | 354/403 X |
| 5,008,695 | 4/1991 | Nagaoka et al. | 354/403 |
| 5,748,211 | 9/1992 | Kotani et al. | 354/403 |

Primary Examiner—Michael L. Gellner
Assistant Examiner—Jae N. Noh
Attorney, Agent, or Firm—Young & Thompson

[57] ABSTRACT

A multi-beam type rangefinding method and device uses three LEDs arranged along a line perpendicular to a base line, and a PSD for receiving light reflected from three measurement regions of a photographic scene. In the gain determining procedure, a selected LED emits light at least once. In the rangefinding procedure, it emits light a plurality of times. Light reflected from an object is received by the PSD which outputs two channel signals. The two channel signals are amplified by two gain control amplifiers which are adjusted to have the same gain. The gain is adjusted to be an optimum value for the two channel output signal levels. Upon changing the gain, light projection by a selected LED is stopped until the output of each gain control amplifier becomes stable. If one of the two channel output signals saturates during the rangefinding procedure, the light projection/measurement is repeated at the same gain after a lapse of predetermined delay time. If the number of times when the output signal saturates becomes a predetermined number during the rangefinding procedure, the rangefinding procedure is recommenced.

27 Claims, 21 Drawing Sheets

FIG. 5
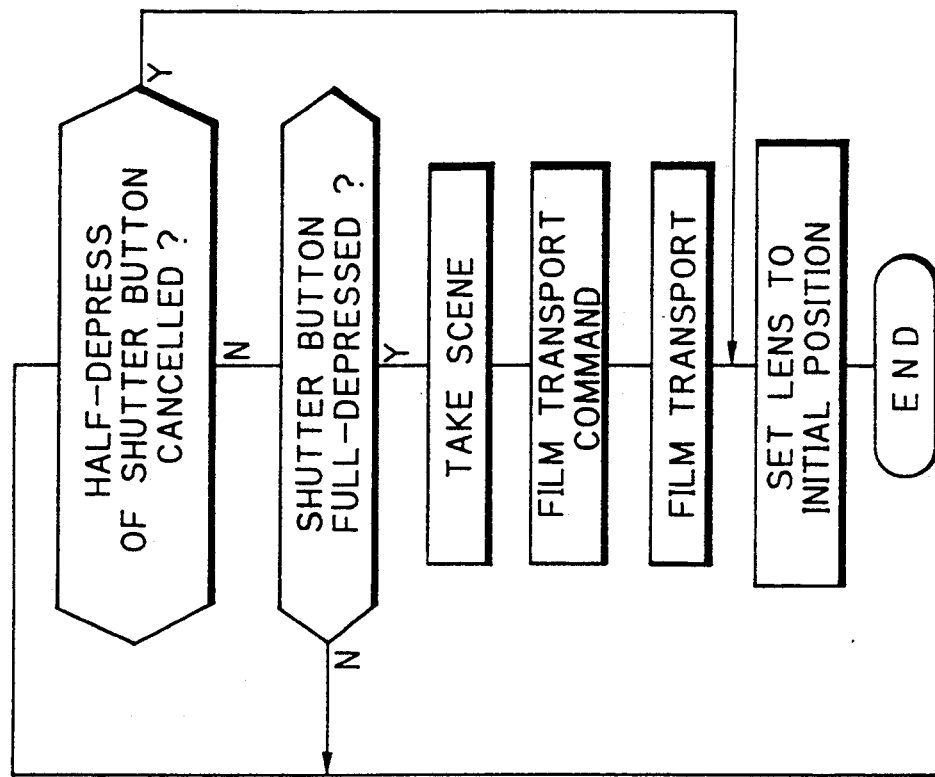
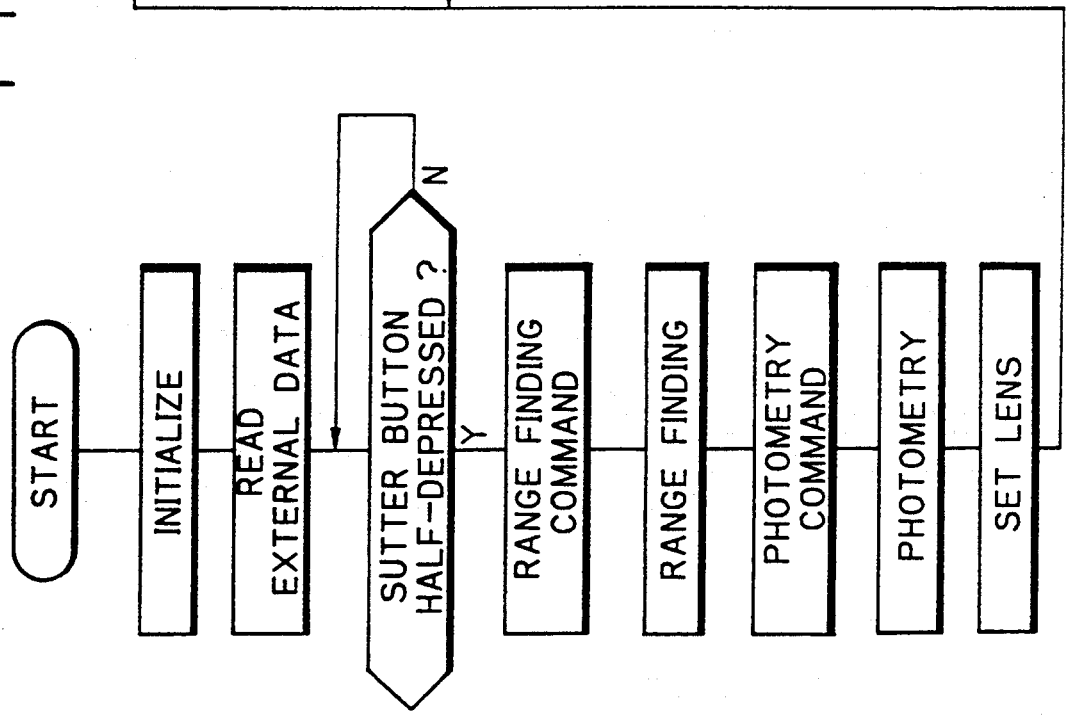

TIME (t)

TIME (t)

METHOD AND APPARATUS FOR RANGEFINDING

This application is a continuation of application No. 07/799,882, filed Oct. 21, 1991, now abandoned.

BACKGROUND OF THE INVENTION

1. Field of the Invention

The present invention relates to an active-type rangefinding method and apparatus for use with photographic cameras and video cameras, and more particularly to a multi-beam rangefinding method and apparatus.

2. Description of Related Art

Active-type rangefinding devices using optical triangulation are widely used in modern compact cameras. A rangefinding device of this type has a light projector and a light receiver spaced apart by a certain base line length. The light projector projects near-infrared light toward a photographic scene, and the light receiver receives light reflected from the object. The position of the reflected light incident upon the light receiver changes with object distance so that the object distance can be measured by electrically detecting the position of the incident reflected light.

The light projector comprises a light source and a projector lens for focusing light from the light source to a spot of light. The light receiver is comprised of a light receiving element and a light receiving lens. As the light source, an LED (Light emitting diode) for emitting near-infrared light is mainly used. As the light receiving element, a semiconductor PSD (position sensitive detector) is often used, which has two output terminals outputting two channel currents corresponding to the intensity and position of the incident light. By calculating the ratio or some other relationship between these two channel currents or their corresponding voltages, a signal dependent upon only the incident position of near-infrared light can be obtained.

The intensity of a spot of light reflected from an object changes with the object distance and reflectivity. Thus, the intensities of the two signals outputted from a PSD may sometimes become too large or small, which reduces measurement precision despite the use of the ratio of the two channel signals. For this reason, as described in U.S. patent application Ser. No. 07/600,821 filed on Oct. 22, 1990, a pair of gain control amplifiers are provided for each channel to obtain a signal having an adequate dynamic range. The gain of each gain control amplifier is set to the same optimum value in accordance with the output signal of each channel supplied from the PSD. Rangefinding is carried out under this condition by providing an appropriate level of the signals of the PSD, so that measurement precision can be made stable irrespective of the object distance and reflectivity.

It takes about 1.5 to 2 msec for the output signal of a gain control amplifier to become stable after the gain is changed. Before this stabilization period, the gain is unstable and an output signal from the gain control amplifier in that time will result in lower measurement precision. Furthermore, if near-infrared light from a fluorescent lamp becomes incident upon a PSD while the gain of a gain control amplifier is being set, the gain is set to a lower value than the optimum value, so that measurement with good precision is not possible.

There is also known a method of improving the precision of rangefinding by projecting light toward an object a plurality of times, supplying the output signals from the gain control amplifiers to a microcomputer, and calculating the object distance using an average value of the output signals. With this rangefinding method, an output signal of a gain control amplifier may saturate (overflow) and exceed the predetermined range, when the illumination condition of an object changes during rangefinding. In such a case, the gain of a gain control amplifier is again adjusted to perform rangefinding.

In particular, the following problem is associated with rangefinding under fluorescent lamp illumination. As is well known, a fluorescent lamp intermittently turns on and off at a frequency twice that of commercial power sources. Assuming that the frequency of a commercial power source is 60 Hz, the period F1 of turn-on/off of a fluorescent lamp is 8.3 msec as shown in FIG. 22A. Assuming that rangefinding is carried out by projecting light eighteen times at intervals F2 of 1 msec as shown in FIG. 22B, the timing of light projection will coincide at least two times with the peak of light radiation from the fluorescent lamp. At these times, the level of the output signal from the gain control amplifier exceeds the predetermined level. Under conditions of fluorescent lamp illumination, the gain adjustment and rangefinding are repeated many times, resulting in the rangefinding being disabled.

Of active-type rangefinding devices, there are multibeam type rangefinding devices wherein light is projected toward not only the central area of a photographic scene or frame but also peripheral areas, thereby to measure a plurality of distances for the object. One of the plurality of distances as determined for the respective measured areas is selected in accordance with a predetermined priority order, and the taking lens is set to a position determined by the selected distance. For example, it is determined whether an object distance at the central area of the frame is 4 to 5 m away or nearer, as a main object is more likely to be located at the central area of a photographic scene. If 4 to 5 m away or nearer, the object distance at the central area is preferentially used. If not, the nearest object distance of the peripheral areas is preferentially used. With a multibeam type rangefinding device, a plurality of measurement data of an object at a plurality of points is obtained by projecting light a plurality of times, which is very effective in obtaining precise measurement. However, there arises the disadvantage that it takes a longer time to measure distances. This longer measurement time may cause the photographer to lose his desired photograph, because autofocus cameras generally carry out rangefinding and photographing upon depression of a single shutter button.

SUMMARY OF THE INVENTION

It is therefore a principal object of the present invention to provide a rangefinding method and apparatus capable of measuring distances with high precision by properly controlling the operation of the gain control amplifiers.

It is another object of the present invention to provide a rangefinding method and apparatus in which the gain of a gain control amplifier is correctly determined even under fluorescent lamp illumination, thereby to correctly measure an object distance during a rangefinding procedure.

It is a further object of the present invention to provide a rangefinding method capable of shortening measurement time by reducing the number of times light is projected toward the peripheral area of a photographic scene, without degrading measurement precision.

In order to achieve the above and other objects of the present invention, when the gain of a gain control amplifier is changed during the gain determining procedure or during a rangefinding procedure, the rangefinding sequence to be executed thereafter is delayed for at least a predetermined time period so that the subsequent rangefinding sequence is carried out after the gain control amplifier becomes stable. It is preferred to effect such a rangefinding sequence delay by delaying the operation of the light projector, thereby preventing unnecessary light projections.

In measuring an object distance where the ambient light includes fluorescent lamp illumination, rangefinding is repeated in exceedingly sensitive response to the intermittent turning on and off of the fluorescent lamp, resulting in the rangefinding operation being altogether disabled. In order to avoid such an occurrence, and according to a preferred embodiment of the present invention, the gain of the gain control amplifier will not be changed, and the rangefinding will be continued, until the output level of the gain control amplifier exceeds a predetermined range a number of times designated CM, during which time light is emitted for distance measuring a number of times designated PN. If the number of excessive outputs reaches the value CM, the rangefinding procedure is resumed after the gain is changed. The value CM is defined by the relation $CM \geq AT \times PN \times 120$ where AT is the time in seconds between successive light projections.

So as further to remove the influence of a fluorescent lamp or the like, when the output level of the gain control amplifier exceeds a predetermined level during a gain determining procedure or a rangefinding procedure, the output of the gain control amplifier at the same gain is read again after a lapse of 1 to 5 msec. In this case, if the output signal of the gain control amplifier again exceeds the predetermined level, it is preferred to stop calculating the distance signal on the basis of the output signal of the gain control amplifier. Light is emitted toward a plurality of measurement points set within both the central and peripheral areas of a photographic scene a plurality of times. Light reflected from the measurement points is received via a light receiving lens by a light receiving element so as to calculate a distance signal for each measurement point. The number of times light is projected toward the peripheral areas of a photographic scene is larger than that at the central area.

According to the present invention, if the gain of a gain control amplifier is changed, a measured signal is obtained only after passage of a delay time sufficient for the gain control amplifier to again become stable. Thus, inaccurate measurement signals as would be output at an unstable gain will not be obtained, resulting in improved measurement precision.

Furthermore, during the rangefinding procedure, the procedure is re-executed whenever the gain control amplifier outputs excessively (saturates) a predetermined number of times. Therefore, it is possible to change the gain in relation to changes in the illumination condition of an object, and the rangefinding procedure will not be disabled even when the ambient light is fluorescent lamp illumination. If the gain control amplifier saturates during the gain determining procedure or during the rangefinding procedure, then the light projection/measurement is re-executed at the same gain after a predetermined time delay. If the gain control amplifier saturates at even this measurement, it is judged that the saturation was not caused by undesired disturbances, and the output signal continues to have high level. And immediately after this judgment, the object distance is determined as a nearest distance or an infinite distance. Therefore, it is not necessary to increase the rangefinding time for determination or change of the gain, resulting in a very effective and efficient rangefinding procedure.

Furthermore, according to the present invention, the number of times that light is projected toward a measurement point at the central area of a photographic scene is set to be greater than that at the peripheral area. Therefore, it is possible to correctly measure the distance to a measurement point with a high probability that the main object has been located. In addition, it is possible to measure the distance to a peripheral area of lesser importance, in a short time. This arrangement provides an advantageous solution to the competing objectives of improving measurement precision and shortening rangefinding time, without practical problems.

BRIEF DESCRIPTION OF THE DRAWINGS

The above and other objects and advantages of the present invention will become more readily apparent to those skilled in this art from the following detailed description of the invention when read in connection with the accompanying drawings, in which:

FIG. 5 is a flow chart showing a photographing sequence;

DETAILED DESCRIPTION OF THE PREFERRED EMBODIMENTS

Figure 1:
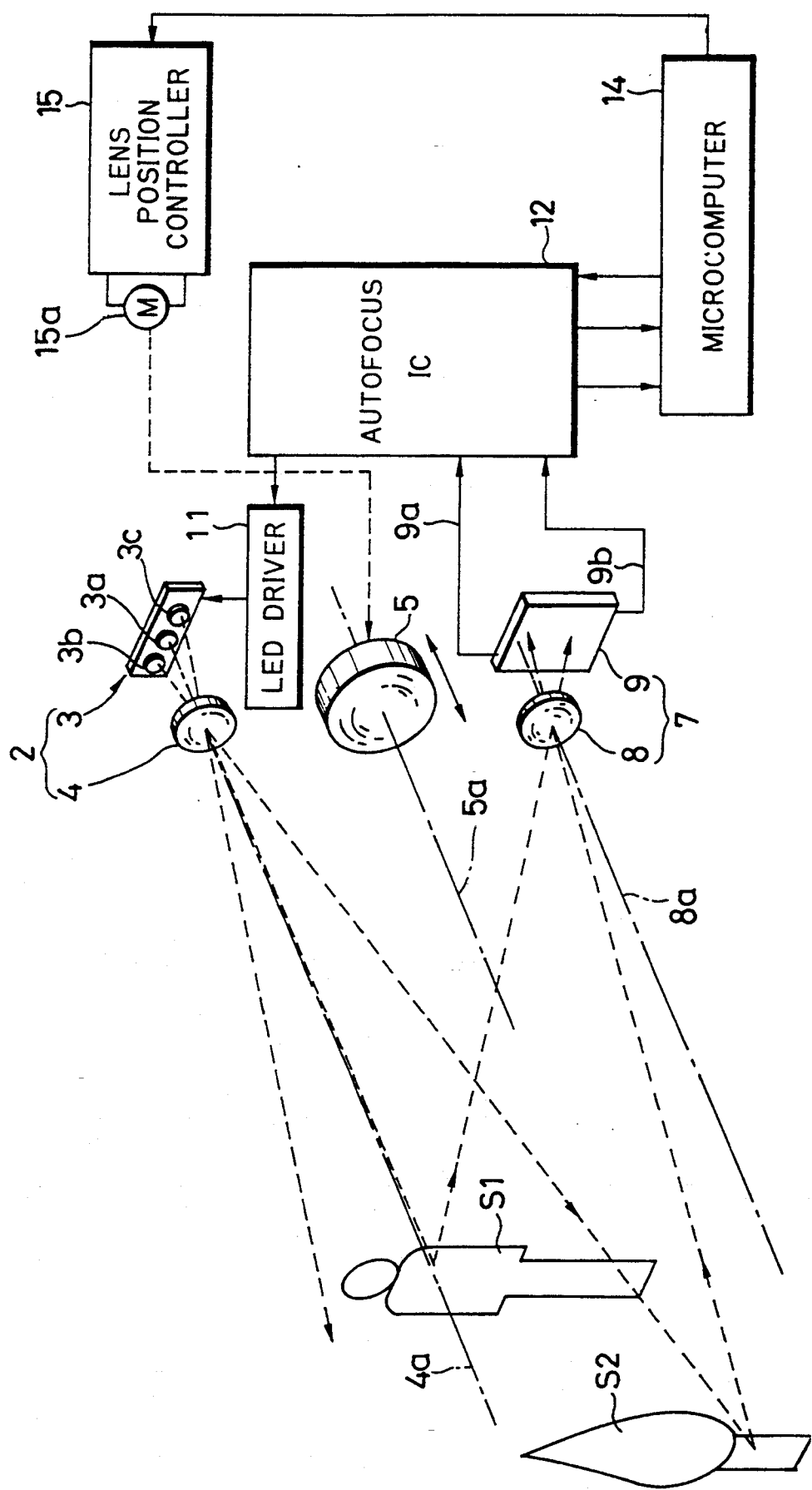
FIG. 1 is a schematic diagram showing the overall configuration of a rangefinding device embodying the present invention.

FIG. 1 shows a multi-beam type rangefinding device, in which a light projector 2 comprises a light source 3 and a light projecting lens 4. The optical axis 4a of the light projecting lens 4 is substantially parallel to the optical axis 5a of the taking lens 5. The light source has three LEDs (light emitting diodes) 3a, 3b and 3c for emitting near-infrared light. These LEDs 3a, 3b and 3c are disposed horizontally on the camera body (not shown), the middle LED 3a being positioned on the optical axis 4a and the LEDS 3b and 3c being positioned to the right and left of the LED 3a. Spotlight beams are sequentially projected toward three areas disposed laterally relative to one another in a photographic scene.

A light receiver 7 comprises a light receiving lens 8 and a rectangular PSD 9. The optical axis 8a of the light receiving lens 8 is substantially parallel to the optical axis 5a of the taking lens 5. The PSD 9 has a filter 10 (see FIG. 2) mounted on its light-receiving surface for admitting only near-infrared light. Currents corresponding to the amount and position relative to the base line direction of the incident light passed through the filter are output from output terminals 9a and 9b of the PSD 9. The nearer the object, the nearer to the output terminal 9b is the light reflected from the object and incident upon the light receiving surface of the PSD 9. The nearer an object, the higher the intensity of the reflected light, so that the absolute values of the currents from the output terminals 9a and 9b become large. However, a signal depending upon only the incident position can be obtained by calculating a sum-to-difference ratio of the output currents, irrespective of the intensity of the reflected light. The PSD 9 has no discrimination function relative to the horizontal direction. If the height levels of incident light are the same in the vertical direction, the ratio of output signals from the output terminals 9a and 9b is the same even though the incident positions may be different in the horizontal direction.

Light emission from the LEDs 3a to 3c is controlled by a signal supplied via an LED driver 11 from an autofocus IC 12. This autofocus IC 12 executes a predetermined rangefinding sequence to activate the LED driver 11, in accordance with a command from a microcomputer 14. The autofocus IC 12 amplifies signals from the output terminals 9a and 9b of the PSD 9, samples and holds them, and supplies them to the microcomputer 14.

The microcomputer 14 may comprise a general purpose type computer. The microcomputer 14 calculates first and second channel signals supplied via the output terminals 9a and 9b of the PSD 9 to obtain distance data for each LED 3a to 3c. The microcomputer 14 selects an optimum one of the three distance data, and sends drive pulses corresponding in number to the selected distance data, to a lens position controller 15. The taking lens position controller 15 drives a stepping motor 15a to set the taking lens 5 to the position corresponding to the distance data.

Figure 2:
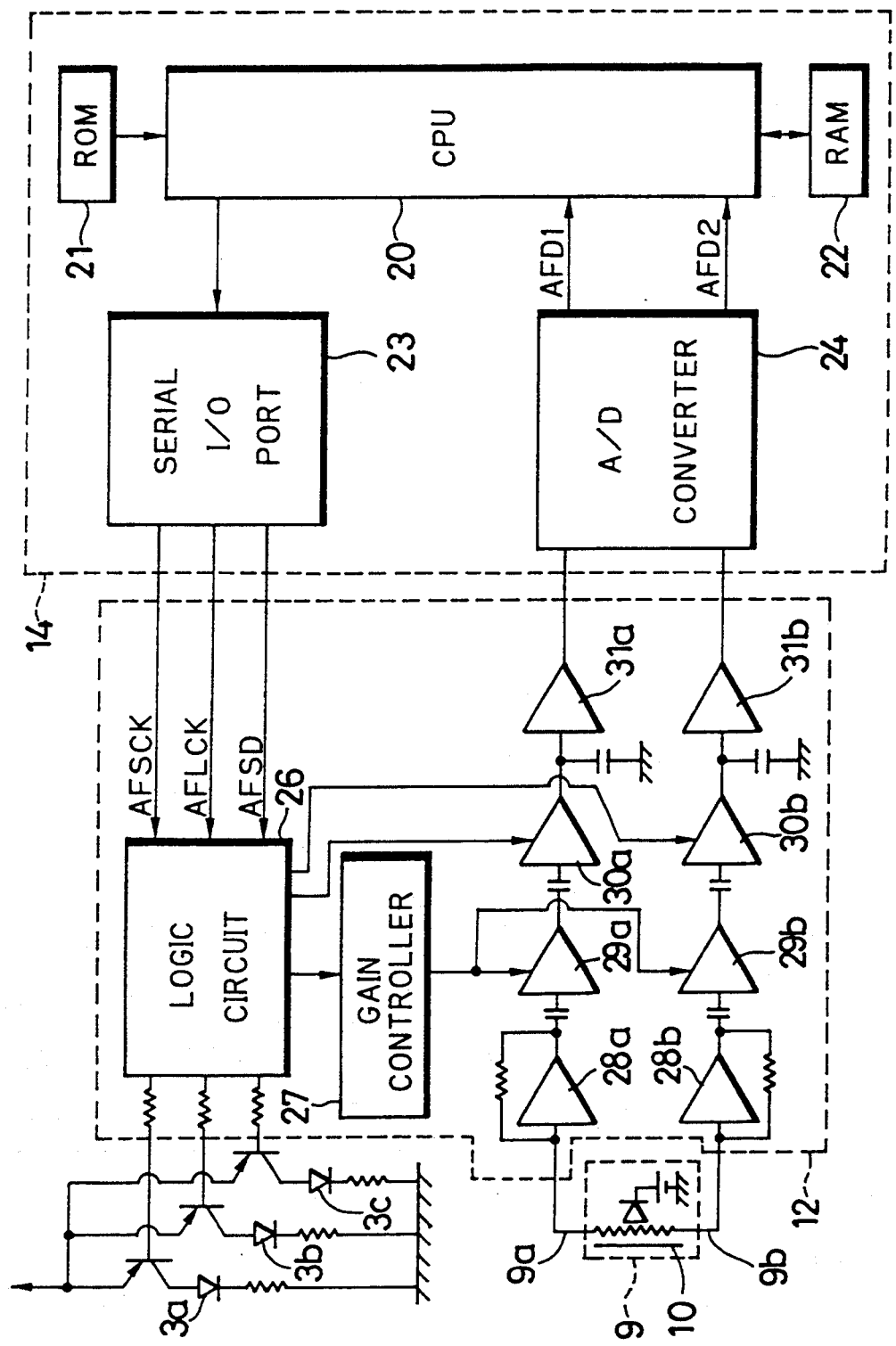
FIG. 2 is a diagram showing the structure of the autofocus IC shown in FIG. 1.

As shown in FIG. 2, the microcomputer 14 is comprised of a CPU 20, a ROM 21, a RAM 22, a serial I/O port 23, and an A/D converter 24. As is well known, the CPU 20 has various registers and an arithmetic and logic circuit, and executes a photographing sequence inn accordance with sequence programs written in the ROM 21. The RAM 22 temporarily stores various data and flags obtained while executing the photographing sequence.

The autofocus IC 12 is a one-chip IC comprising a logic circuit 26, a gain controller 27, pre-amplifiers 28a and 28b for converting the first and second channel currents outputted from the output terminals 9a and 9b of the PSD into voltage signals, gain control amplifiers 29a and 29b, sample-and-hold circuits 30a and 30b, buffer amplifiers 31a and 31b, and other circuits.

The gain control amplifiers 29a and 29b are provided in consideration of the fact that if an object is far away, then the amount of the reflected light incident upon the PSD 9 becomes small and the absolute values of currents from the output terminals 9a and 9b become small. The gain of each gain control amplifier is set at an optimum value in accordance with a gain control process to be described later. The sample-and-hold circuits 30a and 30b sample and hold signals amplified by the gain control amplifiers 29a and 29b in response to sampling pulses from the logic circuit 26. The sampled signals are supplied via the buffer amplifiers 31a and 31b to the A/D converter 24 of the microcomputer 14. The logic circuit 26 basically comprises a shift register of a serial-in and parallel-out type. The gain controller 27 reads gain control data from the shift register at predetermined bit positions to set the common, optimum gain of the gain control amplifiers 29a and 29b.

As described above, the serial I/O port 23 converts a parallel command data from the CPU 20 into serial data pulses (AFSD) and supplies them to the logic circuit 26. The serial I/O port 23 also outputs transfer pulses (AFSCK) for transferring the serial data to the shift register, and control pulses (AFLCK) for use in latching parallel data from the shift register, and in determining gains and emission timings for the LEDs 3a to 3c. An analog signal output from the autofocus IC 12 is converted by the A/D converter 24 into a 7-bit digital signal (having a value from 0 to 127 in decimal notation) corresponding to the analog signal voltage level.

Figure 3:
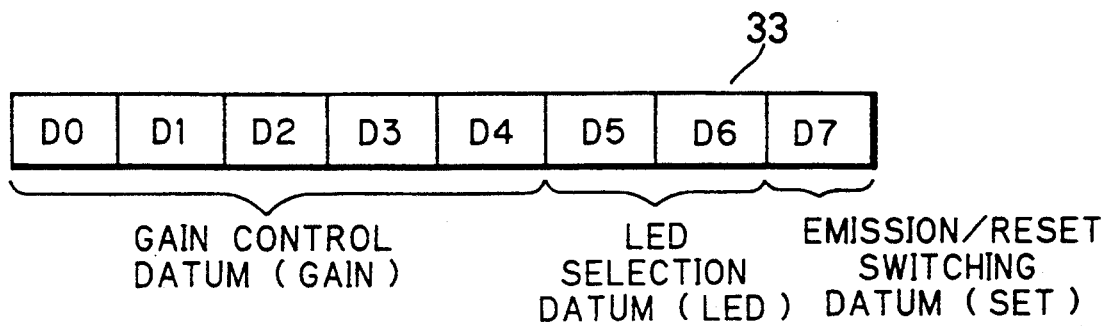
FIG. 3 conceptually depicts a shift register used in the logic circuit shown in FIG. 2.

FIG. 3 conceptually shows the 8-bit serial-in and parallel-out shift register 33 used in the logic circuit 26. A gain control datum (GAIN) is allocated at the 5-bit field from "D0 to D4", an LED selection datum (LED) at the 2-bit field from "D5 to D6", and an emission/reset switching datum (SET) at the one-bit field of "D7". The 5-bit gain control datum can represent any gain level from "0" level to "31" level, in decimal notation. The 2-bit LED selection datum can represent any of four states from "0" to "3" in decimal notation At "0", all the LEDs 3a to 3c are turned off; at "1" only the LED 3a is turned on; and at "2" ("10" in binary) and "3" ("11" in binary), the LEDs 3b and 3c respectively are turned on.

Figure 4:
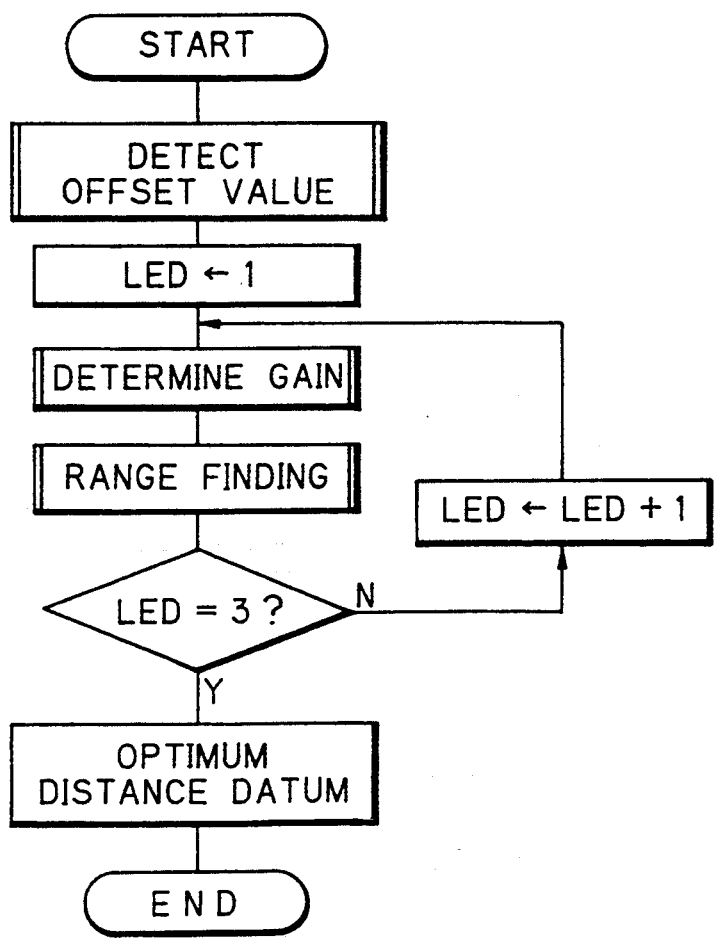
FIG. 4 is a flow chart showing the outline of a rangefinding sequence.

In the overall rangefinding sequence shown in FIG. 4, there are sequentially executed a process for detecting an offset value of an amplifier system of the autofocus IC 12, a process of determining an optimum gain in accordance with the output signals from the gain control amplifiers 29a and 29b while sequentially driving the LEDs 3a to 3c, a process of calculating a distance datum for each LED 3a to 3c by picking up the measured data at the optimum gain, and a process of selecting an optimum one of three distance data.

The particular operation of the sequence described above will now be described in detail with reference to FIGS. 5 to 13. As shown in FIG. 5, when the power-on switch (not shown) of the camera is turned on, data storage areas of RAM 22 are reset to the initial state, and thereafter various external data are read into RAM 22. The external data include information on the state of film loading, lens barrier opening, and the like. After confirming a photographing stand-by state in accordance with the external data, the CPU 20 releases the locked state of the shutter button.

When the shutter button is depressed halfway, the CPU 20 sends a rangefinding command to the autofocus IC 12. The autofocus IC 12 drives the light projector 2 to periodically emit a spot of near-infrared light which is projected toward an object. The light receiver 7 receives near-infrared light reflected by the object to measure the object distance. After the rangefinding, the CPU 20 outputs a photometry command to start measuring the brightness of the object. In accordance with the measured object brightness and a film sensitivity signal, an exposure time providing an optimum exposure is calculated and stored in the RAM 22. After the exposure calculation, the CPU 20 sends to the lens position controller 15 clock pulses corresponding in number to the distance data stored in the RAM 22. Then, the stepping motor 15a is driven so that the taking lens 5 is moved to a lens position corresponding to the distance data.

Upon full depression of the shutter button, a program shutter (not shown) is activated in accordance with the exposure time datum read from the RAM 22. After photographing one frame, the CPU 20 generates a film transport command to activate a film transport mechanism (not shown) to advance the film by one frame. After this one frame advance, the CPU 20 sends a reset signal to the lens position controller 15 to move the taking lens 5 to the initial position. In this manner, one full cycle of the photographing sequence is completed.

Figure 6:
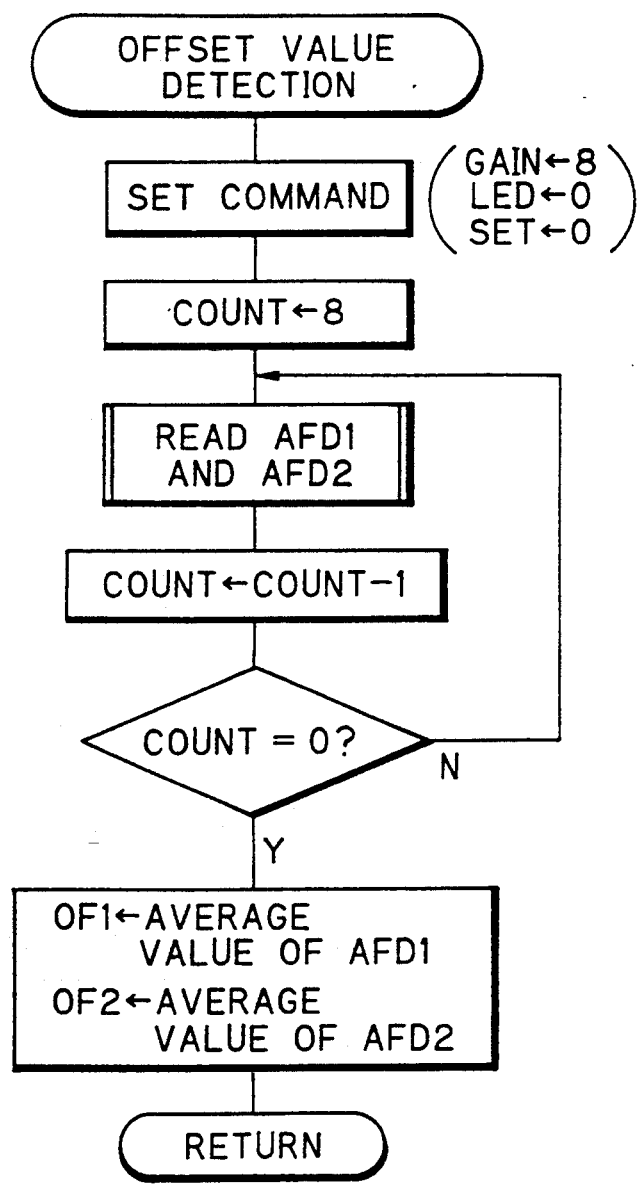
FIG. 6 is a flow chart illustrating the procedure of detecting an offset value.

The measurement of object distance will now be described in detail. At the start of the rangefinding sequence, the procedure for detecting an offset value is executed as shown in FIG. 6. For the offset value detecting procedure, "01000000" is set in the shift register 33 at the bit positions of "D0 to D7". Command data for "GAIN=8", "LED=0", and "SET=0" are set accordingly. The command data are set when the control pulse AFLCK becomes a low level at the time P1 shown in the timing chart of FIG. 7, i.e., after eight transfer pulses AFSCK have been output. The serial data pulses are sequentially transferred to the shift register 33 at the rising edge of the transfer pulse AFSCK.

After transferring the above command data, a datum "COUNT=8" is set in a predetermined register within the CPU 20.

Of the command data set in the shift register 33, the data "GAIN"=8" is supplied via the gain controller 27 to the gain control amplifiers 29a and 29b, thereby to set the gains thereof to the initial value (minimum value) "8". In the rangefinding device of this invention, the "GAIN" value from "8" to "31" is used selectively so as to maintain the linearity of the amplification characteristic. This range may be determined depending upon the camera specifications, LED light emission amount, and the like.

After transferring these serial data, output signals from the first and second channels are sampled and held, the A/D converted data AFD1 and AFD2 thereof being read into the microcomputer 14. In this data reading procedure as shown by the timing chart of FIG. 7 and the flow chart of FIG. 8, the control pulse AFLCK is caused to be low during a period ΔT1. At the time P2, after the time period AT7 has elapsed during which the control pulse AFLCK is of a low level, one of the LEDs dictated by the command data is turned on. At the end of time period AT2, the signal AFSD becomes high level. At this time the sample-and-hold circuits 30a and 30b hold the output signals from the gain control amplifiers 29a and 29b. At time P3 after the passage of a further time period AT3, the LED in question is turned off. The sample-and-hold process is terminated when the AFSD signal becomes high level after a time period ΔT4.

Figure 7:
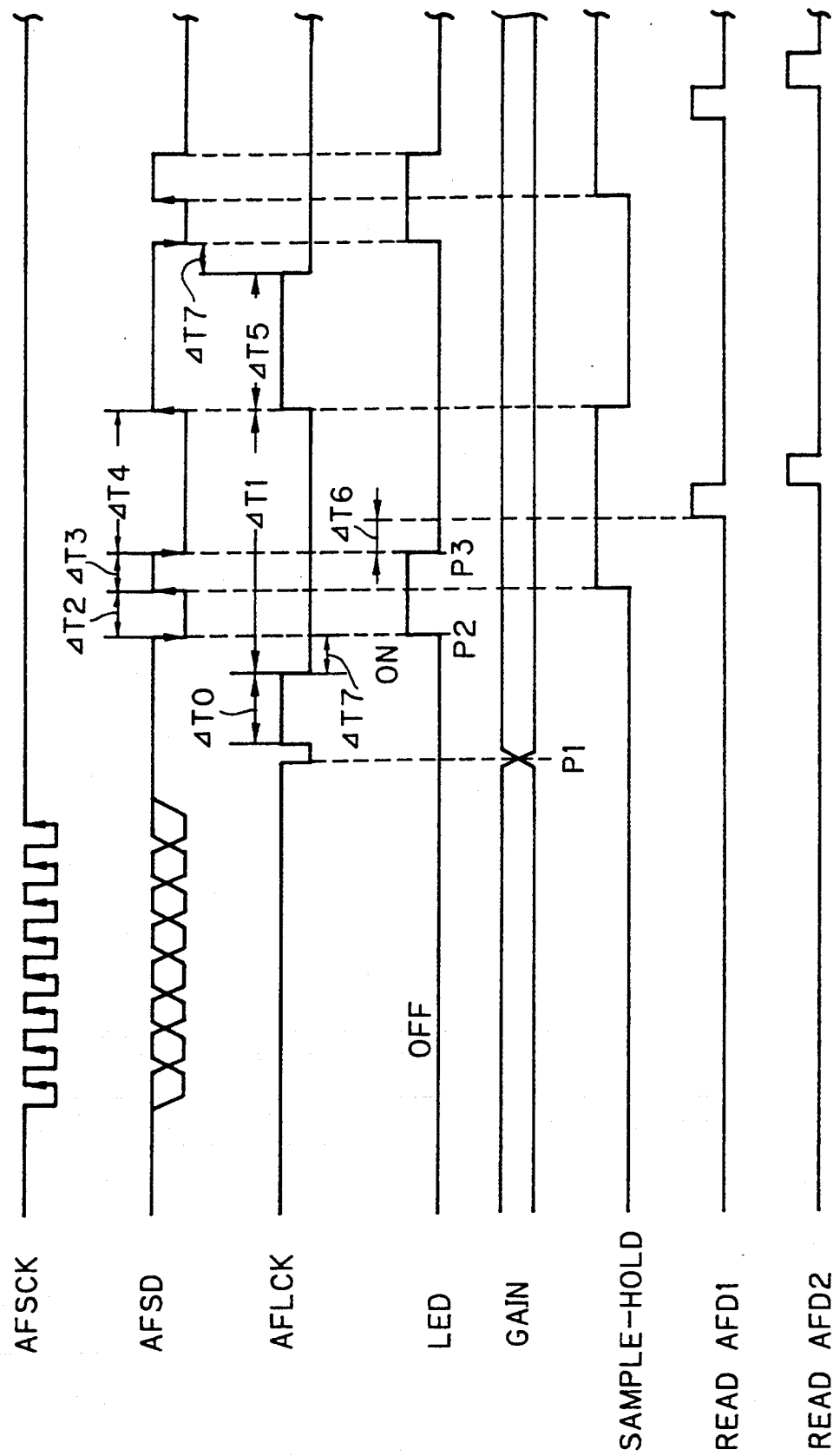
FIG. 7 is a timing diagram showing the times at which measured data are read.
Figure 8:
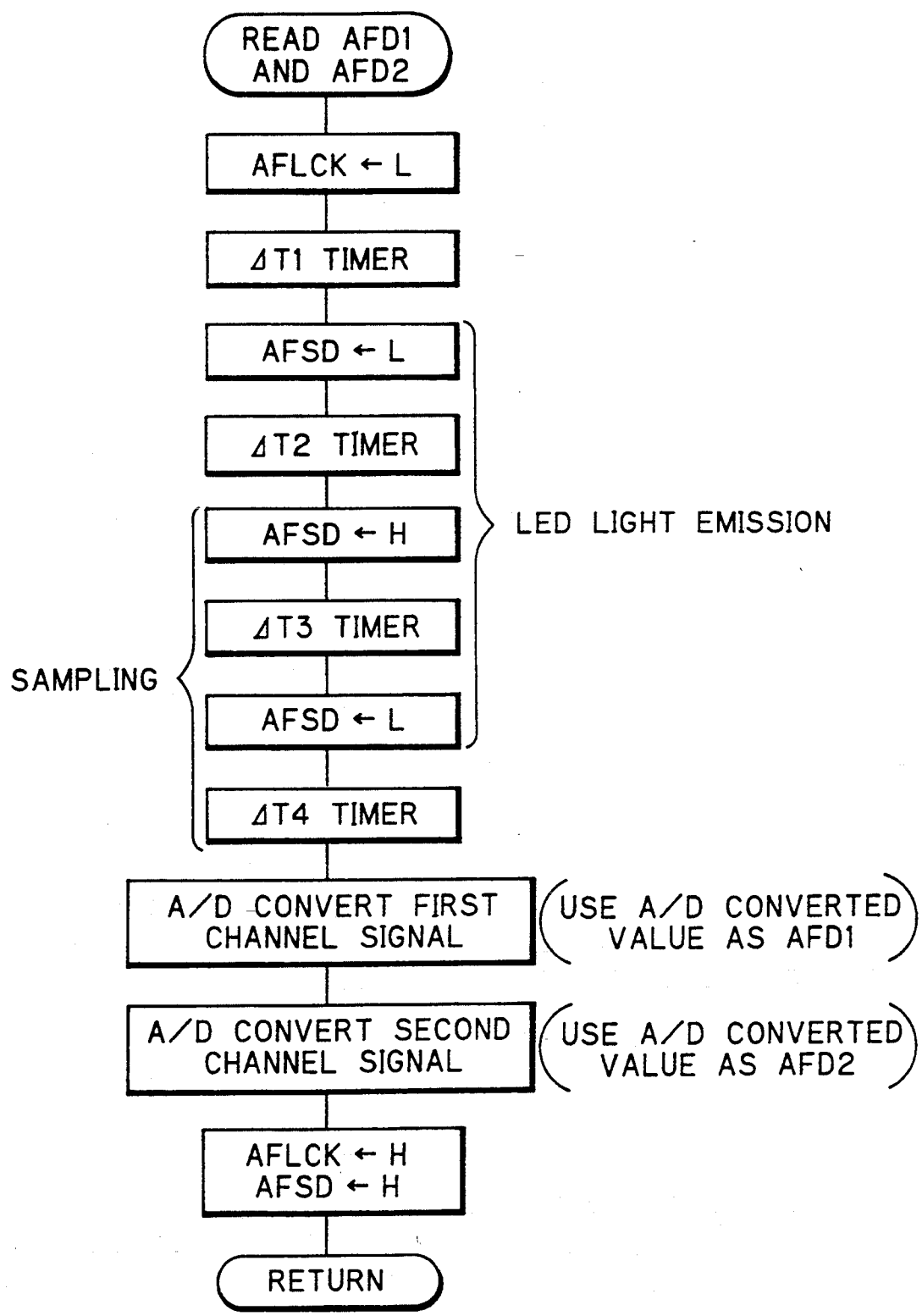
FIG. 8 is a flow chart illustrating the procedure of reading measured data.
Figure 9:
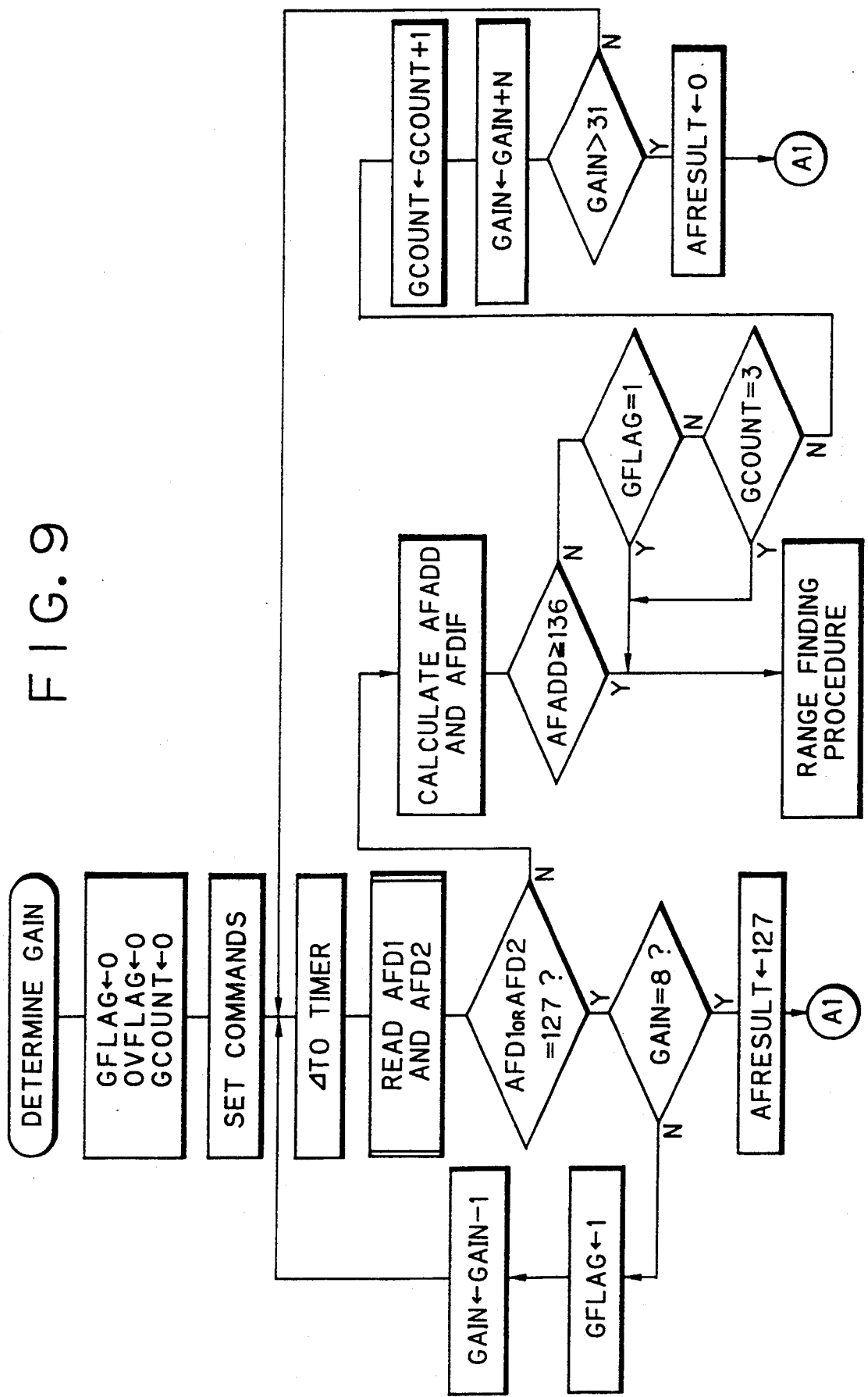
FIG. 9 is a flow chart illustrating the procedure of determining a gain.

In FIG. 7, the control pulse AFLCK is caused to be low during the time period AT1 for the purpose of turning on the LEDs. In the procedure of detecting an offset value upon issuance of a command "LED=0" the control pulse AFLCK is maintained at high level. Thus, the LEDs are turned off during the offset value detecting procedure, and the gain control amplifiers 29a and 29b are set to "GAIN=8". Under these conditions, output signals from the gain control amplifiers 29a and 29b are sampled and held by the sample-and-hold circuits 30a and 30b.

After a time period AT6 beginning at the time P3 when the AFSD signal becomes low level, the output signals held by the sample-and-hold circuits 30a and 30b are supplied to the buffer amplifiers 31a and 31b, and to the A/D converter 24 wherein they are converted into 7-bit digital signals. These digital signals are stored in RAM 22 at predetermined addresses under the control of CPU 20, as the first and second channel measurement data AFD1 and AFD2.

In the procedure of determining gain and measuring object distance, a designated LED is turned on once during the time period AT1 while the control pulse AFLCK is maintained at low level. While the LED is turned on, the output signals from the gain control amplifiers 29a and 29b are sampled and held by the sample-and-hold circuits 30a and 30b. Irrespective of whether an LED is turned on or off, one cycle of reading measurement data is completed at the end of the high level time period AT5 of the control pulse AFLCK.

In the procedure of detecting an offset value, the reading of the measurement data AFD1 and AFD2 is repeated eight times. Two sets of eight measurement data for the first and second channels are averaged and used as offset values OF1 and OF2. As described above, the offset value detecting procedure is carried out while all the LEDs are turned off, and the obtained offset values represent noise caused by ambient light incident upon the PSD 9, noise generated by signal processing systems downstream of the pre-amplifiers, and other noises.

After detecting the offset values, the procedure of determining gain and measuring object distance is carried out for each of the LEDs 3a to 3c. The gain determining procedure is executed in accordance with the flow chart shown in FIG. 9. At the start of the gain determining procedure, flags "GFLAG", "OVFLAG" and "GCOUNT" are set in RAM 22 to an initial state of "0". Thereafter, a serial datum representative of a new command is transferred from the serial port 23 to the logic circuit 26. Namely, at the time P1 when the control pulse AFLCK becomes low level, a binary datum "01000011" is set in the shift register 33. Thus, there is provided a command of "GAIN=8", "LED=1" and "SET=1". In this condition, only the LED 3a is allowed to emit light. After setting the above new command, the LED 3a is turned on for the time period "AT2+AT3" and the sampling process is carried out. Then, the measurement data AFD1 and AFD2 are read. The time period for which the LEDs 3a to 3c are turned on is set to 1 msec, for example.

In setting an initial value of the gain or after setting a new gain, the start of the rangefinding sequence is delayed for a predetermined time period, thereby to permit reading of the measurement data AFD1 and AFD2 only after the operation of the gain control amplifiers 29a and 29b has become stable. The gain of the gain control amplifiers 29a and 29b is set after establishing a command data in the shift register 33 at the time P1. It takes about 1.5 to 2 msec for the gain control amplifiers 29a and 29b to stabilize. This time period for 2 msec is set as the time period ΔT0. After passage of this time period, the LED 3a is caused to emit light and the output signals from the stabilized gain control amplifiers 29a and 29b are sampled. If measurement data are read while maintaining the same gain, the time period ΔT0 is set to "0" as shown in FIG. 7.

As shown in FIG. 1, when light is projected onto a main object S1 from the LED 3a, the light reflected from the object becomes incident upon the PSD 9 via the light receiving lens 8. The signals output from the terminals 9a and 9b of the PSD 9 contain information of the intensity and position of light incident upon the PSD 9. The output signals are converted into digital signals by the A/D converter 24 (FIG. 2) and read as the measured data AFD1 and AFD2 (FIG. 7).

Next, the CPU 20 judges whether the values of the measured data AFD1 and AFD2 correspond to the decimal number "127" (i.e., seven "ones" in binary). If the value AFD1 or AFD2 reaches "127" it means that the corresponding measurement data have become saturated (overflowed). Accordingly, the measurement data in that case are considered to be quite unreliable. In this case, after confirming "GAIN=8", a procedure of "AFRESULTa" →127" to be described later is carried out to terminate range finding using the LED 3a. This case corresponds to one in which an object at the central area of a scene is at rather a near position and in which the reflected light is too bright even at a relatively low gain of "GAIN=8".

Figure 10:
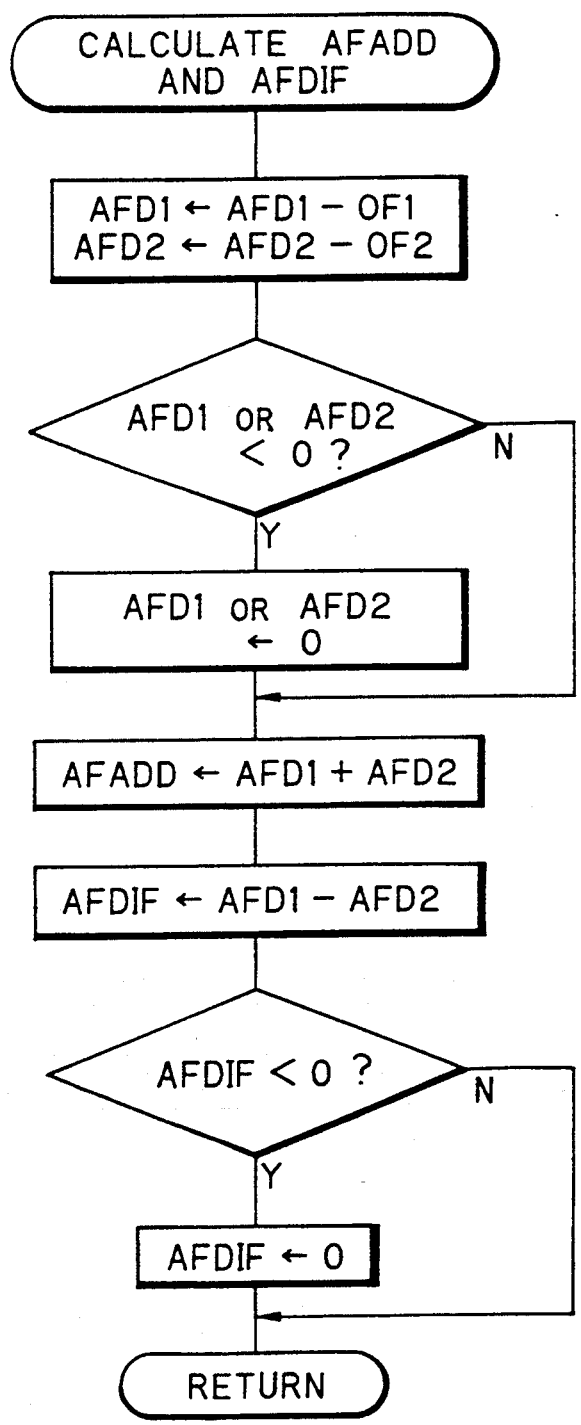
FIG. 10 is a flow chart illustrating the procedure of calculating addition measurement data and subtraction measurement data.

If there is no overflow of the measured data AFD1 and AFD2, there is performed the procedure of calculating an additive datum AFADD and a subtractive datum AFDIF by adding the measurement datum AFD1 to the datum AFD2 and by subtracting the measured datum AFD2 from the datum AFAD1, respectively, as shown in FIG. 10. In this calculation, in order to remove noise components, offset values OF1 and OF2 are subtracted from the measured data AFD1 and AFD2, respectively. If subtraction of the offset value produces a negative value, or if the subtractive datum AFDIF has a negative value, these values are set to "0" to simplify the following calculation.

Figure 11:
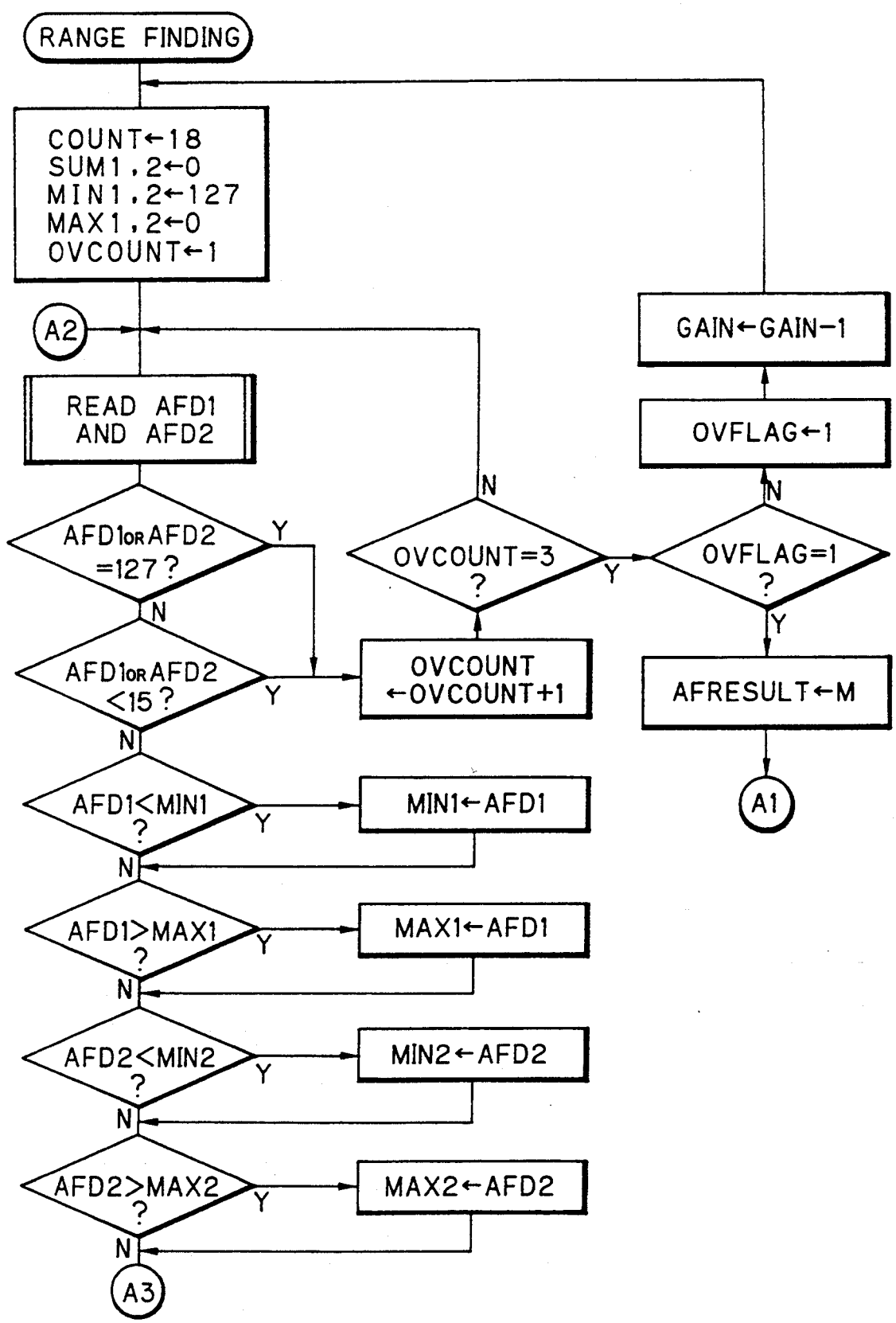
FIG. 11 is a flow chart showing the first half of the rangefinding procedure.

It is then determined whether the additive datum AFADD is equal to or greater than "136". If the value is equal to or greater than "136" then it is judged that the absolute values of the measurement data AFD1 and AFD2 are within a range suitable for the succeeding rangefinding calculation, and the current "GAIN" value is chosen as the gain for the gain amplifiers 29a and 29b. With the gain control amplifiers 29a and 29b set at this "GAIN" value, the rangefinding procedure for the LED 3a follows as shown in FIG. 11.

On the other hand, if the additive measurement datum AFADD has a value less than "136", then after confirming that the flag "GFLAG" is not "1" which is representative of an improper "GAIN" value, a factor "N" is added to the "GAIN" value in order to increase the absolute values of the measurement data AFD1 and AFD2, the results being stored in the RAM 22. The value "N" is defined in accordance with the value of the additive measurement datum AFADD as in the following table.

TABLE 1

| AFADD | 98 or more | 97 down to 70 | 69 to 50 | 49 to 36 | 35 to 26 | 25 to 19 | 18 to 14 | 13 or less |
|---|---|---|---|---|---|---|---|---|
| N | +1 | +2 | +3 | +4 | +5 | +6 | +7 | +8 |

For the purpose of changing the "GAIN" value, a new command including a new gain value is set in the shift register 33. In this case, the data in the shift register 33 at only the bit positions "D0 to D4" are changed, and the other data are maintained unchanged. In accordance with the new "GAIN" value, the gain controller 33 sets the gains of the gain control amplifiers 29a and 29b, and similar operations as above are repeated thereafter. Also during this repeated process, a delay of time ΔT0 is provided after changing the gain change command, so that the measurement data are read after the gain control amplifiers 29a and 29b become stable. During this repeated process, it may happen that an overflow occurs at "GAIN>8". In this case, "GFLAG" is set at "1" and the "GAIN" value is decreased by "1".

Supposing that even at the maximum "GAIN" value of "31" there is not produced the additive datum AFADD having a proper absolute value, this means that the light reflected from an object is extremely weak or that no such light reached the PSD 9. The latter case corresponds to one in which the object is at a very great distance, so that the succeeding rangefinding operation is not necessary. In such cases, the procedure "AFRESULTa → 0" is executed without performing rangefinding.

The number of gain setting operations in the gain determining process is defined by the equation:

$$RN = (GM - IG) / NM$$

where RN is the number of gain setting operations, IG is the initial gain, GM is the maximum gain, and NM is the maximum correction value. In this embodiment, GM=31 and IG=NM=8, so RN=2.9, or approximately 3. Accordingly, the number RN of gain setting operations is limited to "3". When "GCOUNT =3", the "GAIN" at that time is selected and the gain determining process is terminated. With this limitation, even if the intensity of light reflected from an object changes and the values of the measurement data AFD1 and AFD2 change, it takes less time to determine a gain. Furthermore, the upper limit of the number of gain setting operations is determined by dividing the gain correction width "31−8" by the maximum correction value "8" so that the value of the gain can be changed up to the maximum value "31" even if the value of AFADD is extremely small.

Figure 12:
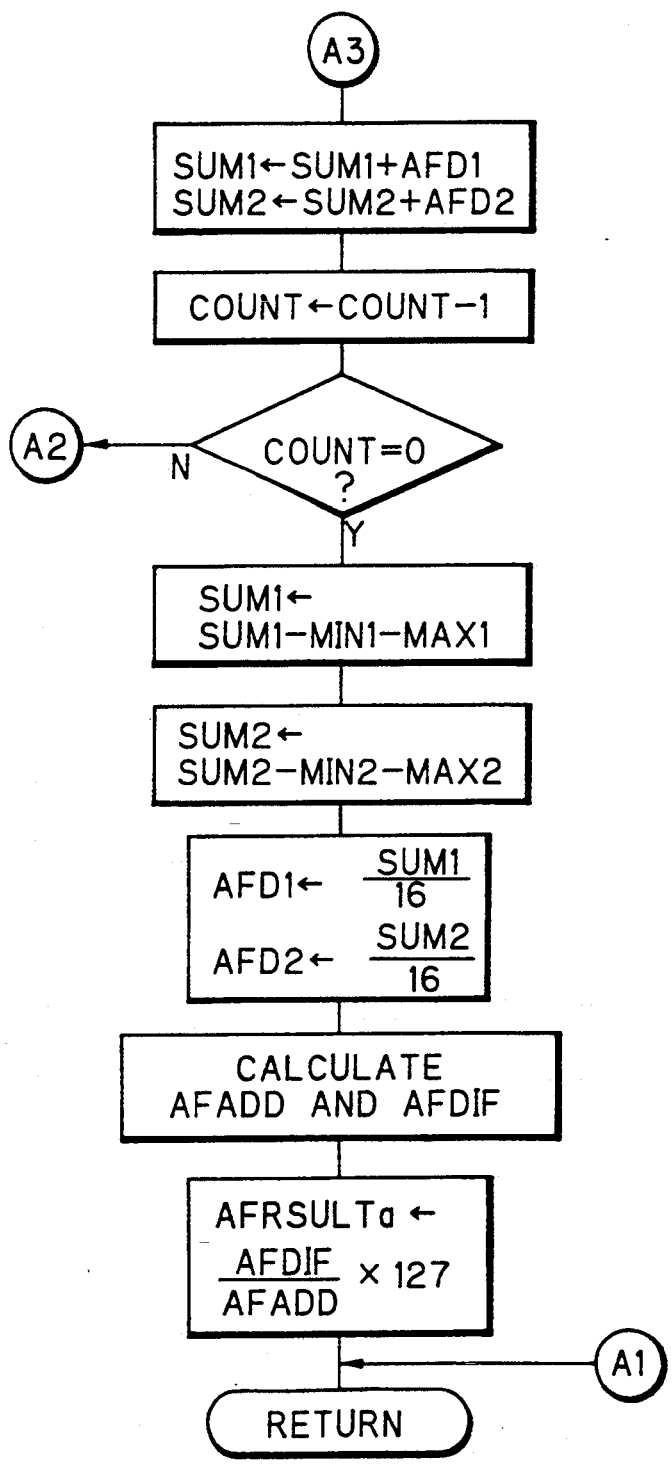
FIG. 12 is a flow chart showing the second half of the rangefinding procedure.

After the "GAIN" value is determined by the above-described procedure, the rangefinding procedure for the LED 3a begins. The rangefinding procedure is shown in FIGS. 11 and 12. After various initial values are stored in the RAM 22, the LED 3a is turned on eighteen times, and each time, the measurement data AFD1 and AFD2 are read in. Each time the measurement data AFD1 and AFD2 are read in, a check is performed to determine whether they have overflowed or whether their absolute values are below "5" below which the data values are insufficient for the succeeding rangefinding operation. In that case, it is judged that the measurement data AFD1 and AFD2 are improper, and a count "OVCOUNT" respectively improper rangefinding is incremented by "1". In this case, light is again projected to produce measurement data.

An upper limit of "OVCOUNT" will now be described. If the upper limit of "OVCOUNT" is too small, then "OVFLAG" is likely to be set and the distance data will be obtained from the value M in Table 2 described later, even if the illumination condition of an object changes by chance or in a short time period. The obtained data are thus improper. Most changes in the illumination condition result from a fluorescent lamp which is driven by a commercial power source frequency. Taking the frequency 120 Hz to be twice that of this power source frequency, the upper limit CM of "OVCOUNT" is described by the relation:

$$CM \geq AT \times PN \times 120$$

where AT is the interval between successive light projections, and PN is the number of light projections.

In this embodiment, the light projection interval AT is 1 msec and the light projection number PN is 18, so the above formula becomes:

$$CM \geq 1 \times 10^{-3} \times 18 \times 120 = 2.16$$

The value "OVCOUNT" is an integer, so the value "3" is obtained by rounding up the above result. By setting the upper limit using the above formula, even if the timing of light projection is twice coincident with the light emission peak of a fluorescent lamp, the rangefinding procedure can be continued. In this case, light is projected twenty times to obtain one distance datum. It is apparent that the two measurement data at "OVCOUNT" are not used in the rangefinding operation.

When the count "OVCOUNT" reaches "3" it is judged that the "GAIN" value determined by the gain determining procedure is improper. In this case, the flag "OVFLAG" is set to "1" and the "GAIN" value is reduced by "1" to again perform rangefinding from the initial condition. When changing the gain during the rangefinding operation it is possible that a further command will be set. In this case, the delay time period ΔT0 is observed prior to turning on the LED 3a. If the time period required for storing a plurality of initial data in the RAM 22 is equal to or greater than ΔT0, then this time period ΔT0 can be omitted.

In order to prevent the rangefinding from being repeated too many times, when the count "OVCOUNT" again reaches "3" after the flag "OVFLAG" has already once been set to "1", i.e., when the total value of "OVCOUNT" reaches "6" the value of "AFRESULTa" is determined to be "M" as defined by the "GAIN" value at that time. Table 2 is used to determine the value "M".

TABLE 2

| GAIN | 31 | 30 | 29 down to 27 | 26 to 25 | 24 or less |
|---|---|---|---|---|---|
| M | 0 | 10 | 21 | 25 | 35 |

If the count "OVCOUNT" is less than "3" then the rangefinding continues at the current gain. In the succeeding process the maximum and minimum values of the measurement data AFD1 and AFD2 are removed to obtain an average value of a plurality of measurement data. Therefore, even if there are two abnormal measurement data caused by overflow, the rangefinding operation is rarely influenced by such abnormal data.

During the procedure of reading the measurement data AFD1 and AFD2, the minimum and maximum values thereof for the two channels are checked and the measurement values AFD1 and AFD2 are added for each channel as "SUM1" and "SUM2". The maximum and minimum values of AFD1 and AFD2 are subtracted from the sum values "SUM1" and "SUM2" obtained from eighteen light projections, and thereafter the average values are calculated. The average values may be calculated without removing the maximum and minimum values, although the measurement precision is lowered. In that case, the divisor would be "18".

The obtained average values for the respective channels are subjected to offset value correction in accordance with the procedure shown in FIG. 10, and thereafter they are transformed into the additive data AFADD and subtractive data AFDIF. The ratio of these data is multiplied by "127" to obtain "AFRESULTa", whereupon the rangefinding procedure for the LED 3a is complete.

Next, the LED 3b is activated to carry out the gain determining and rangefinding procedures, and then the LED 3c is activated to carry out the same procedures, thereby to obtain the values of "AFRESULTb" and "AFRESULTc", respectively. In calculating an average value and distance data, a division operation is performed in which a rounding-off, rounding-up, or counting fractions over ½ as one is carried out to obtain an integer.

Figure 13:
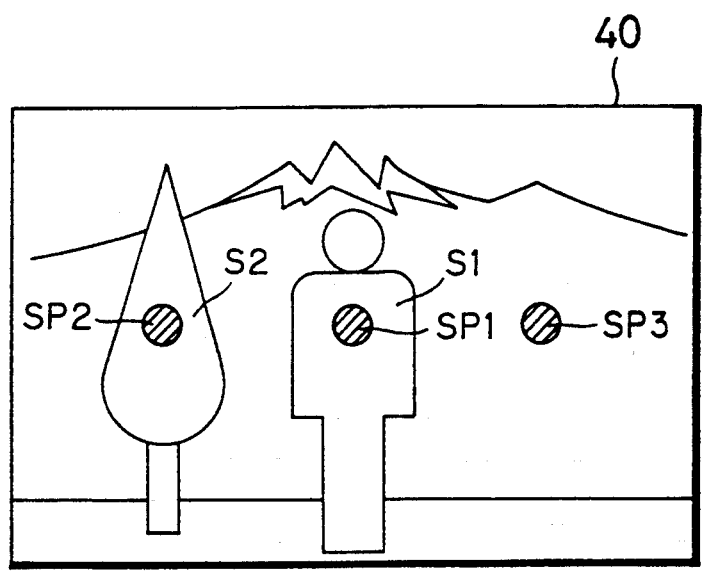
FIG. 13 shows an example of a photographic scene on which rangefinding is to be carried out.

As shown in FIG. 13, the LED 3a projects light toward a measurement point SP1 at the center of a photographic scene (frame) 40, and the LEDs 3b and 3c project light toward measurement points SP2 and SP3 at the peripheral area of the photographic scene 40. In this photographic scene 40, the measurement point SP1 is located at a main object S1, and the measurement point SP2 is located at a background object S2. Therefore, the "AFRESULTa" corresponds to a distance to the main object S1, the "AFRESULTb" corresponds to the distance to the background object S2, and "AFRESULTc" is "0" (refer to FIG. 9) because a pulsed light beam is not reflected.

In accordance with a program stored in the ROM 21, the microcomputer 14 checks whether the "AFRESULTa" has a value corresponding to an object distance in the range from a nearest distance to 5 m. If so, it recognizes as the optimum distance datum the value "AFRESULTa". If not, it recognizes as the optimum distance datum the value representing the nearest object distance among the values "AFRESULTa" "AFRESULTb" and "AFRESULTc". At this stage, the rangefinding sequence has been completed.

After determining the optimum distance datum, the lens position controller 15 drives the stepping motor 15a to set the taking lens 5 to the lens position corresponding to the optimum distance datum. Various other algorithms may be selected to determine the optimum distance datum from the values "AFRESULTa", "AFRESULTb", and "AFRESULTc".

In the above embodiment, if the outputs from the gain control amplifiers 29a and 29b saturate during the gain determining operation, then the measurement is performed again by lowering the gain by "1". When photographing indoors, an object will often be illuminated by fluorescent light. In such a scene, the outputs of the gain control amplifiers 29a and 29b may temporarily saturate when receiving noise from a fluorescent lamp even if the gain is proper. In view of this, in the case where the outputs of the gain control amplifiers 29a and 29b are substantially saturated during the gain determining process, the measurement is again performed using the same "GAIN" value. In this measurement, it is preferred to delay reading the measurement data AFD1 and AFD2 by a predetermined time period, e.g., 1 to 5 msec. FIGS. 14 to 17 show such an embodiment. In this embodiment, eight bits (representing values from "0" to "255" in decimal notation) are used for each measurement datum.

Figure 14:
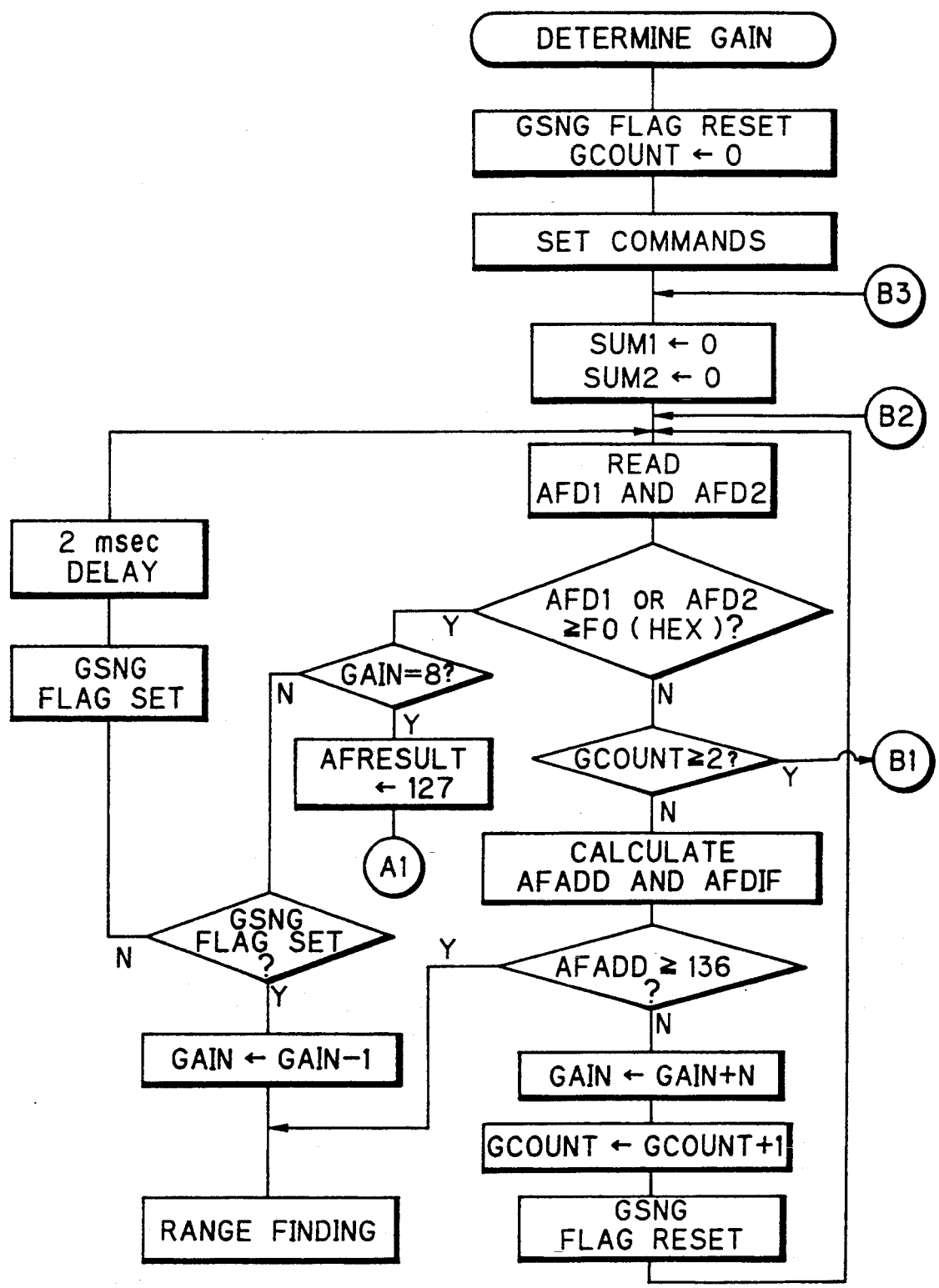
FIG. 14 is a flow chart showing the first half of the gain determining procedure according to a further embodiment of the invention.

Referring to FIG. 14, when the gain determining procedure commences, a flag "GSNG flag" is reset and a count "GCOUNT" is set to an initial value of "0". In a manner similar to the embodiment shown in FIG. 9, the gains of the gain control amplifiers 29a and 29b are set to an initial value of "8" and the command "LED=1" and "SET=1" are set so as to turn on only the LED 3a.

After setting the commands, data AFD1 and AFD2 are evaluated while the LED 3a is turned on for the time period "ΔT2 +ΔT3" following the time period ΔT0. It is judged whether the values of the measurement data AFD1 and AFD2 reach a saturation value, e.g., "F0" in hexadecimal notation ("240" is decimal notation). If one of the measurement data AFD1 and AFD2 is greater than or equal to the saturation value "F0" the procedure of "AFRESULTa→127" is executed after confirming that the gain value is the initial value "8".

If the measurement data AFD1 and AFD2 reach the saturation value while the gain value is greater than or equal to "9" then it is confirmed that there was a saturated state in the past. Then, the flag "GSNG flag" is reset and the measurement data AFD1 and AFD2 are again read after passage of 2 msec at the same gain value. If the measurement data reach the saturation value, the gain value is decremented by "1" to produce a new gain value. The gain determining procedure is terminated so as to start the rangefinding procedure. In this manner, the gain control amplifiers 29a and 29b are prevented from again becoming saturated, and the time period required for gain determination is shortened. The case wherein one of the measurement data AFD1 and AFD2 reaches the saturation value while the gain value is equal to or greater than "9" does not occur during the first gain determining process but rather during the repetition routine.

The reading of the measurement data AFD1 and AFD2 at the same gain is executed after the time delay of 2 msec as described above. The reason for this is as follows. Assuming that fluorescent lamp noise superimposed on the output of gain control amplifiers 29a and 29b has the waveform shown in FIG. 17 and that the read timing of the measurement data AFD1 and AFD2 becomes coincident with the turn-on timing of the fluorescent lamp at time t1, then the noise components caused by the fluorescent lamp remain for the time period Δx (1.5 to 2 msec). The next measurement data AFD1 and AFD2 are read after a minimum delay of 1 msec, the timing being shifted to the time t2 when the noise components become maximum. In this manner, it is possible to obtain measurement data AFD1 and AFD2 that is less influenced by noise. The 2 msec time period may be obtained by the ΔT0 timer. In order to completely remove the influence of noise components, it is preferred to set the delay time to about 5 msec. In practical use, the delay time may be set at any value within the range from 1 to 5 msec.

If the measurement data AFD1 and AFD2 do not reach the saturation value at the initial gain value of "8" the additive data AFADD and subtractive data AFDIF are calculated from the measurement data AFD1 and AFD2. It is judged whether the additive data AFADD is greater than or equal to "136" in decimal notation. If "136" is greater, it is judged that the additive data AFADD1 and AFADD2 have a proper value for executing the ensuing rangefinding. The gains of the gain control amplifiers 29a and 29b are determined to be the "GAIN" value (initial value "8") at that time so as further to execute the rangefinding operation by means of the LED 3a.

As described above, if the additive data AFADD is less than "136" then the value "N" is added to the "GAIN" value and the count "GCOUNT" representative of the number of gain determining operations is incremented by "1" to repeat the same processing. During this repetition, if the measured data reach the saturation value at "GAIN >8" then the gain is determined by the procedure of "GAIN→GAIN−1" in the set state of the "GSNG flag", thereby to execute the rangefinding procedure.

As will be appreciated from the foregoing description, when the measurement data AFD1 and AFD2 reach the saturation value at the initial gain "8" of the gain control amplifiers 29a and 29b, the distance data are immediately set to a value corresponding to that of a nearest distance. Even if the measurement data does not reach the saturation value and the additive data AFADD has a proper level, then the rangefinding procedure is executed at the initial gain "8" of the gain control amplifiers 29a and 29b. During the period while the value "GCOUNT" is "1" i.e. during the period while the gains of the gain control amplifiers 29a and 29b are small, the influence of noise is small so that it is advantageous to rapidly determine the gains and to execute the rangefinding procedure.

Figure 15:
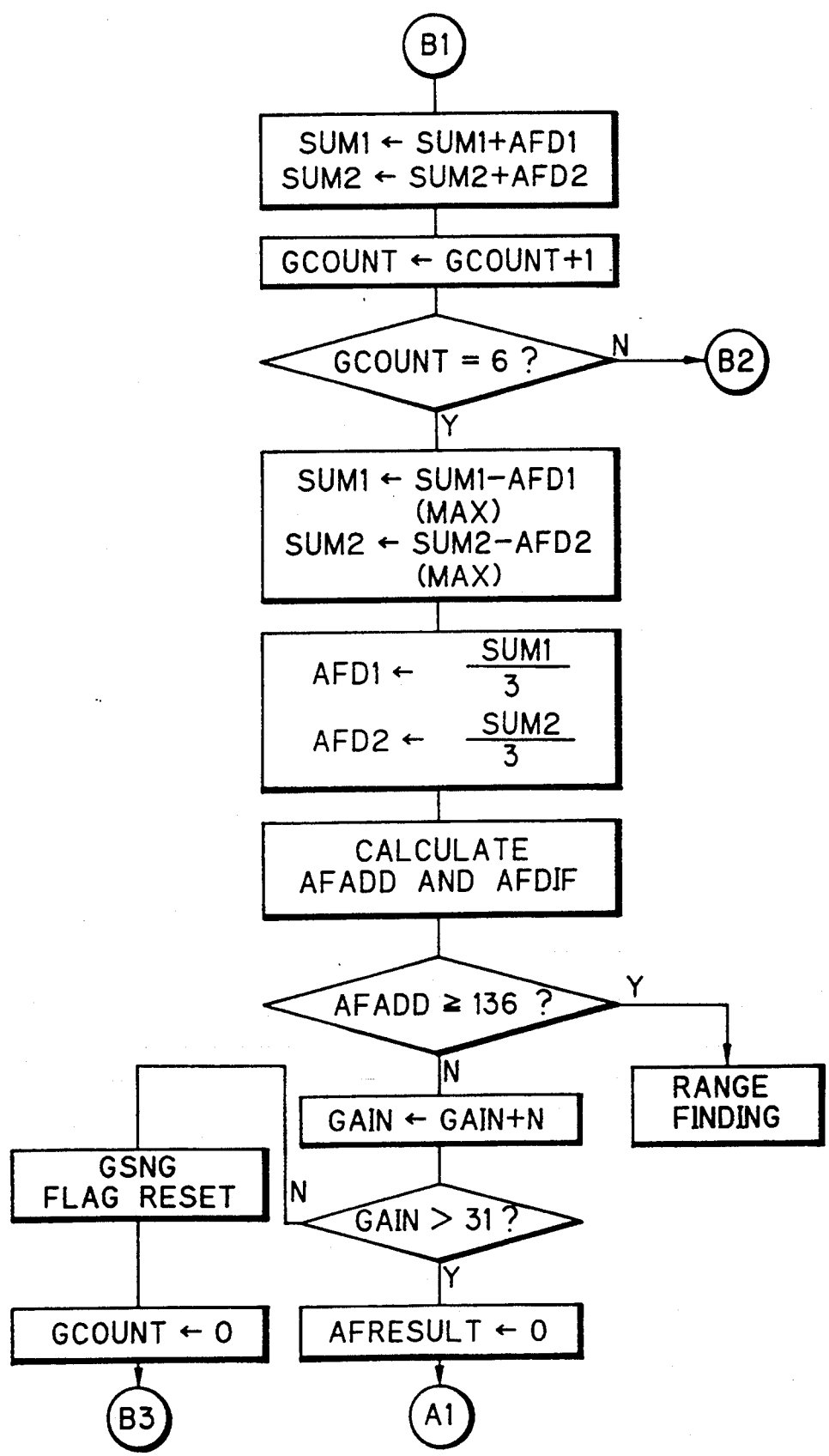
FIG. 15 is a flow chart showing the second half of the gain determining procedure of FIG. 14.

On the other hand, in the case where "GCOUNT" becomes ≧2" while the gain determining procedure is repeated and the gain value is increased, the measurement data AFD1 and AFD2 are read until the value becomes "GCOUNT=6" for thereafter sequentially accumulating the measurement data as "SUM1" and "SUM2" as illustrated in FIG. 15 At "GCOUNT=6" the maximum values of the measurement data AFD1 and AFD2 for the two channels are subtracted from the accumulated "SUM1" and "SUM2" values, respectively, to calculate the average values which are used as the new "AFD1" and "AFD2" values.

As shown in FIG. 10, the obtained measurement data AFD1 and AFD2 are subjected to an offset correction process to thereafter calculate the additive data AFADD and subtractive data AFDIF. If the relation "AFADD≧136" is satisfied, then the gain at "GCOUNT=2" is determined as being an optimum gain for thereafter executing the rangefinding operation. If "AFADD≧136" is not satisfied and the gains of the gain control amplifiers 29a and 29b exceed the maximum value "31" it means that the object is far away such that light reflected therefrom is only faintly incident upon the PSD 9. Accordingly, there is obtained the distance data "AFRESULT=0" for setting the taking lens 5 at infinity. At this time the rangefinding for the LED 3a is terminated. If the gain does not exceed the maximum value "31", then the "GSNG flag" is reset and the count is set to "GCOUNT=0".

Figure 17:
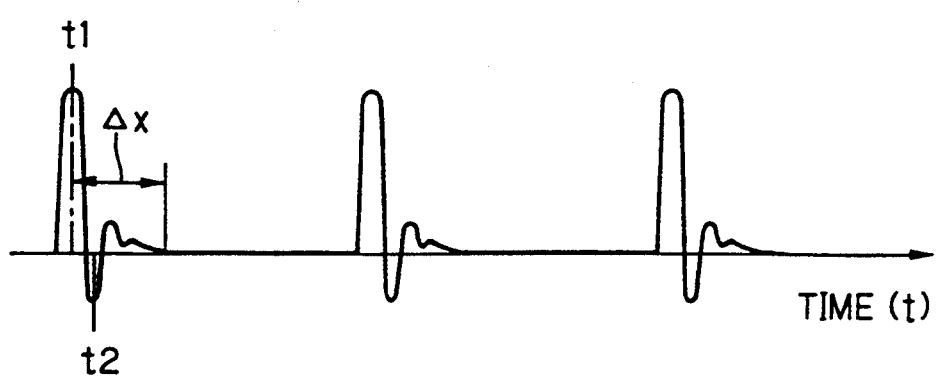
FIG. 17 shows a waveform with noise components superimposed on measurement data during the turning on and off of a fluorescent lamp.

In the above manner, when the gains of the gain control amplifiers 29a and 29b are set high, a plurality of measurement data AFD1 and AFD2 are read to determine the gains while considering the average values thereof. Thus, the gains can be set with less influence by ambient noise. In calculating the average values of the accumulated values SUM1 and SUM2 of the measurement data AFD1 and AFD2, the maximum values of AFD1 and AFD2 are subtracted. Accordingly, even if the measurement data AFD1 and AFD2 are read under an ambient illumination condition in which there is intermittent light emission from a fluorescent lamp at a frequency twice that of the commercial power source frequency, and even if periodic noise components as illustrated in FIG. 17 are superimposed on the measurement data AFD1 and AFD2, the measurement data AFD1 and AFD2 read at the time t=t1 can nevertheless be removed during the average value calculation operation, which is very effective in determining the proper gain. Obviously, the measurement data AFD1 and AFD2 read at the time t=t2 upon occurrence of an undershoot may also be subtracted from the accumulated values SUM1 and SUM2 prior to calculating the average values.

Figure 16:
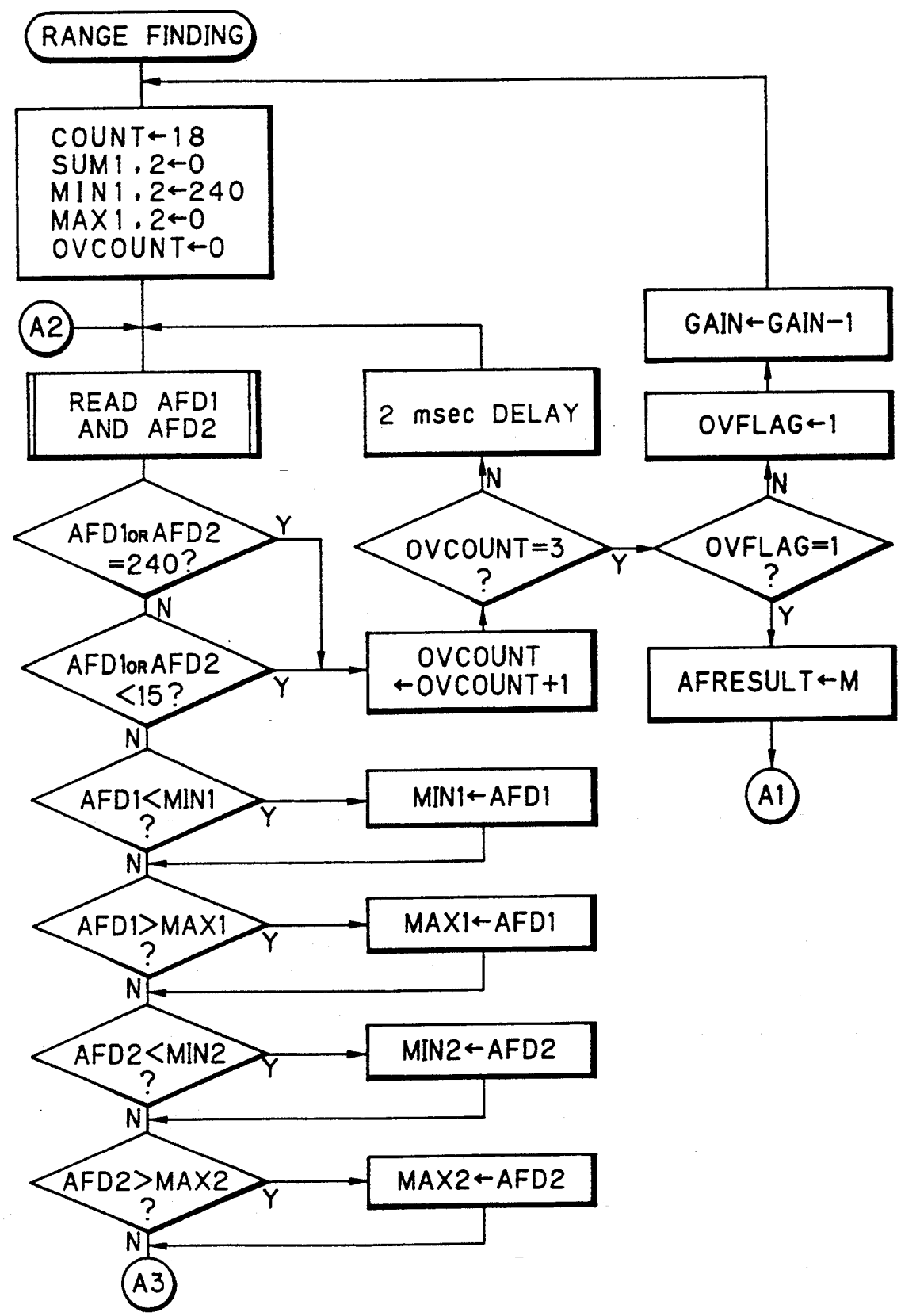
FIG. 16 is a flow chart showing the rangefinding procedure according to a further embodiment of the invention.

In a manner similar to that of the above embodiment, after determining the "GAIN" value, the rangefinding procedure for the LED 3a is executed. In the rangefinding procedure, if the measurement data are improper at a value less than "3" of the "OVCOUNT" as shown in FIG. 16, the measurement data AFD1 and AFD2 are read again after the delay time of 2 msec at the same gain. In this manner, it is possible to obtain proper measurement data AFD1 and AFD2 at the next measurement even if the timing of reading the measurement data becomes coincident with the light emission timing of a fluorescent lamp at the preceding measurement and the measurement data reaches the saturation value. The eighteen measurement data AFD1 and AFD2 are read to calculate the AFADD and AFDIF by the procedure shown in FIG. 10 and to calculate the distance data "AFRESULT" by the procedure shown in FIG. 12.

Most photographic scenes have a main object at the center of the scene, and scenes having the main object at the peripheral area are relatively uncommon. In view of this, it is preferred to reduce the number of light projections toward the peripheral area of a scene, in order to shorten the rangefinding time. FIGS. 18 to 21 show such an embodiment. Eight bits are used for each measured datum.

Figure 18:
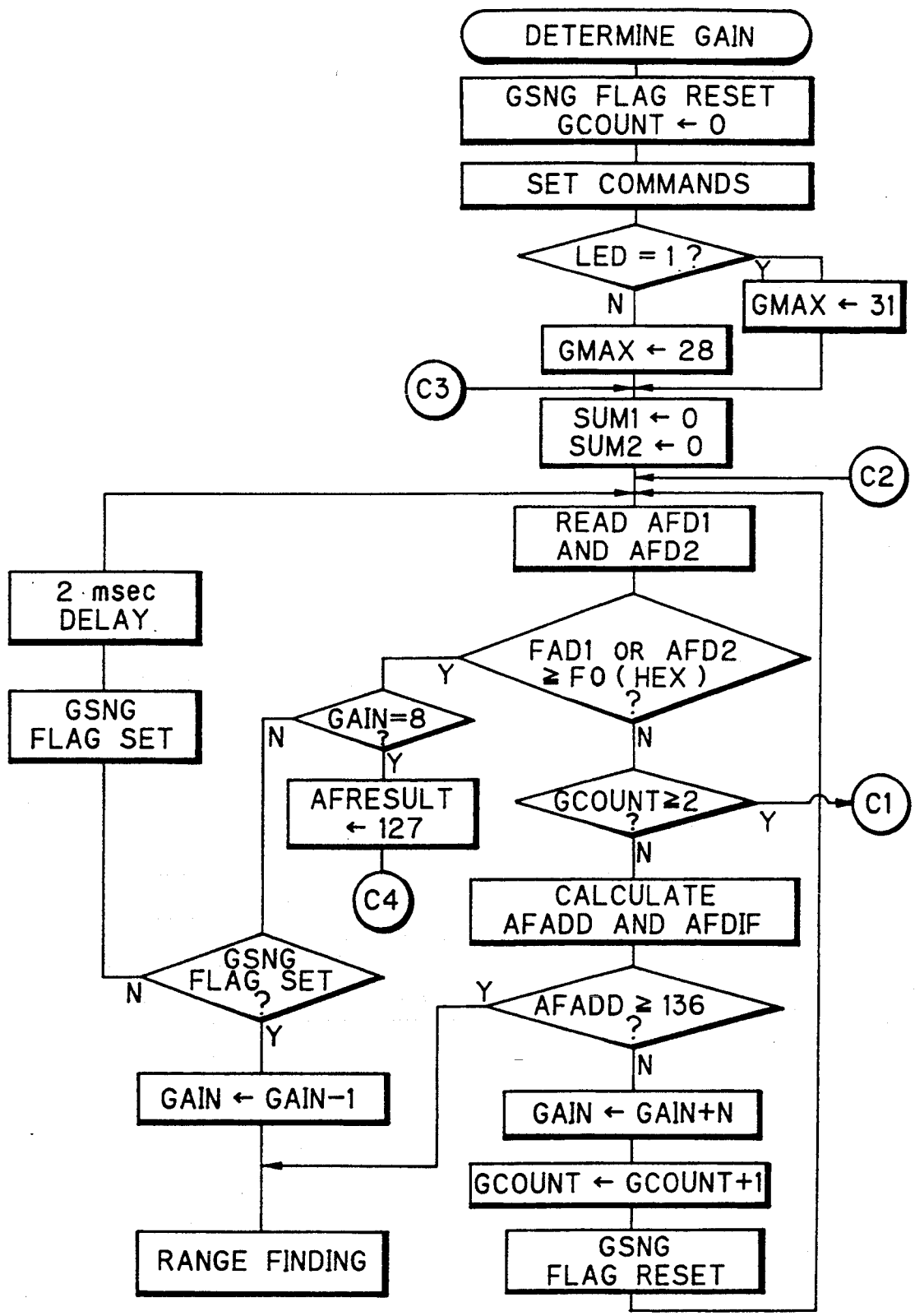
FIG. 18 is a flow chart showing the first half of the gain determining procedure used with that embodiment of the invention in which the number of light projections is varied based on the measurement point.
Figure 19:
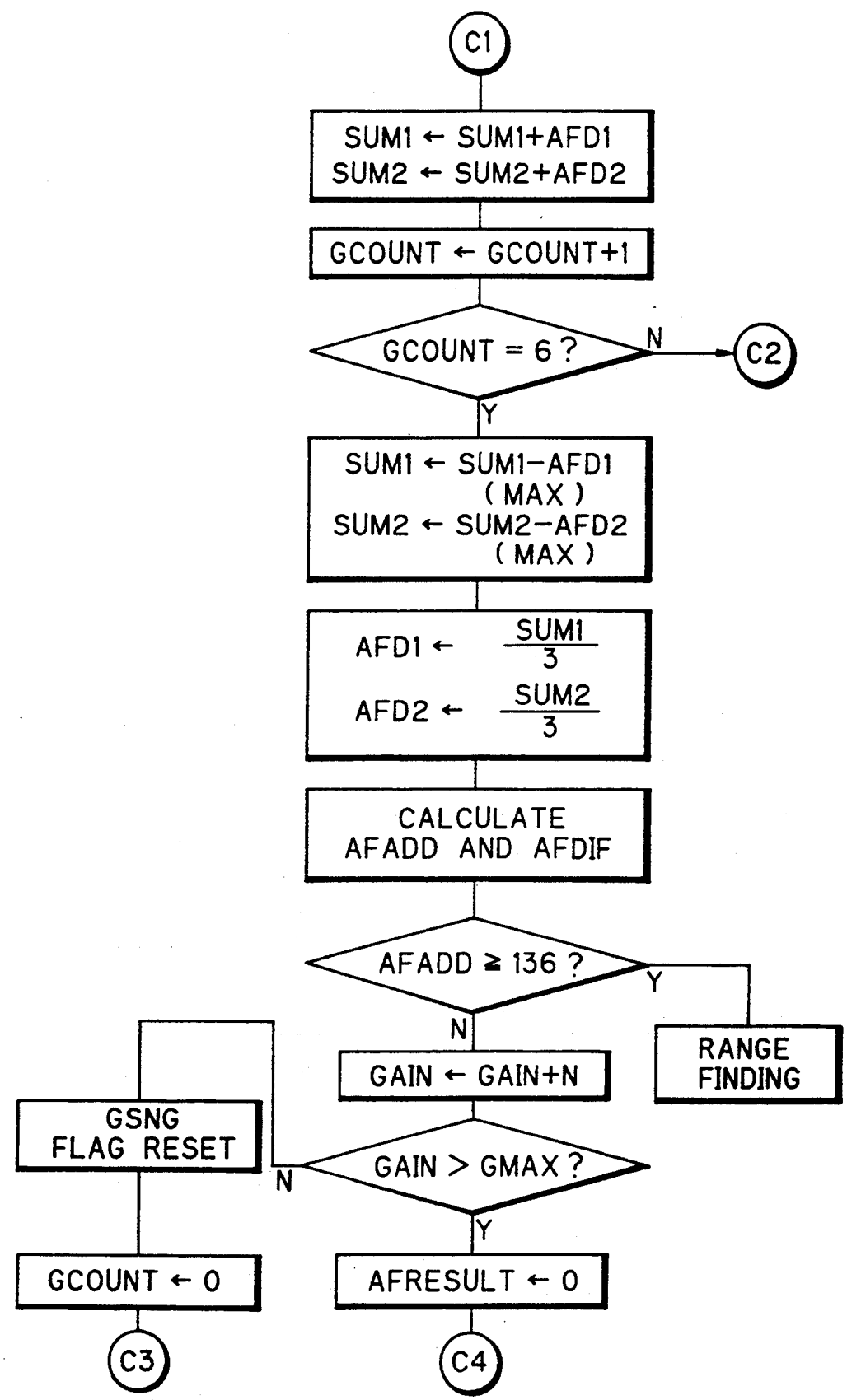
FIG. 19 is a flow chart showing the second half of the gain determining procedure of FIG. 18.

The gain determining procedure of this embodiment is executed in accordance with the flow chart shown in FIGS. 18 and 19. The maximum gain value "GMAX" that can be changed in the gain determining procedure is limited to "31" for the LED 3a that measures the central area of a photographic scene (frame), whereas the maximum gain value "GMAX" is limited to "28" for the LEDs 3b and 3c that measure the peripheral area of the scene. The reason for changing the value "GMAX" depending on the measurement region is as follows. Light reflected from the measurement points SP2 and SP3 of FIG. 13 is oblique relative to the light receiving lens 8 and the intensity thereof is relatively lower. If the gain is set too high to amplify such a small light amount, then noise is also amplified resulting in variations of the measurement data. By reducing the maximum gain value for measuring the measurement points SP2 and SP3, the influence of noise upon the measurement data can be reduced substantially so as to be the same in the central area as in the peripheral area, thereby to maintain the same measurement condition. Therefore, the measurement precision can be improved. In addition, it is possible to shorten the rangefinding time by determining at an earlier stage the distance data by setting "AFRESULT=0". The gain determining procedure of this embodiment is the same as that shown in FIGS. 14 and 15 except for the limitation by "GMAX", so the detailed description thereof is omitted.

Figure 20:
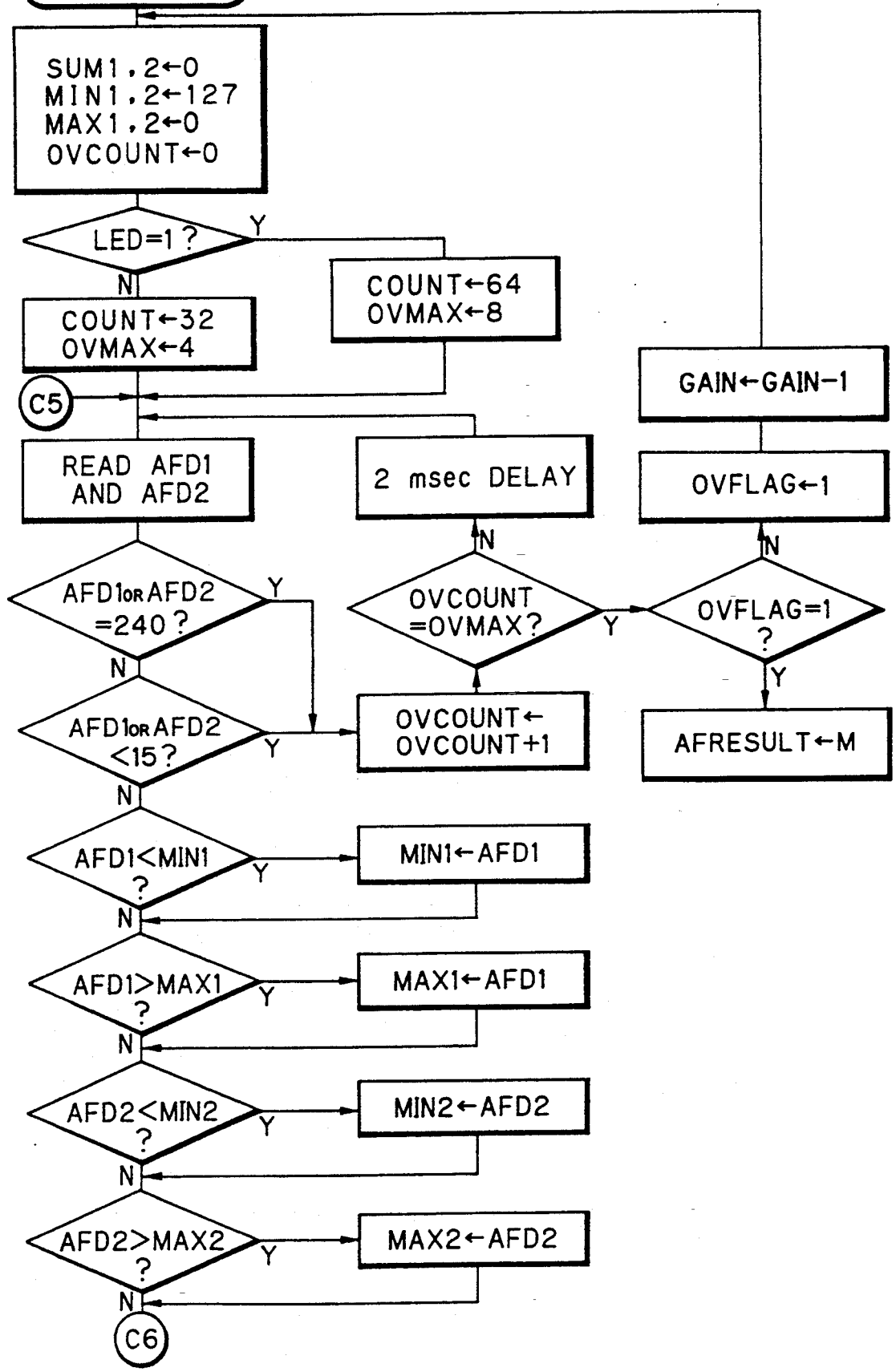
FIG. 20 is a flow chart showing the first half of the rangefinding procedure used with the embodiment shown in FIG. 18.
Figure 21:
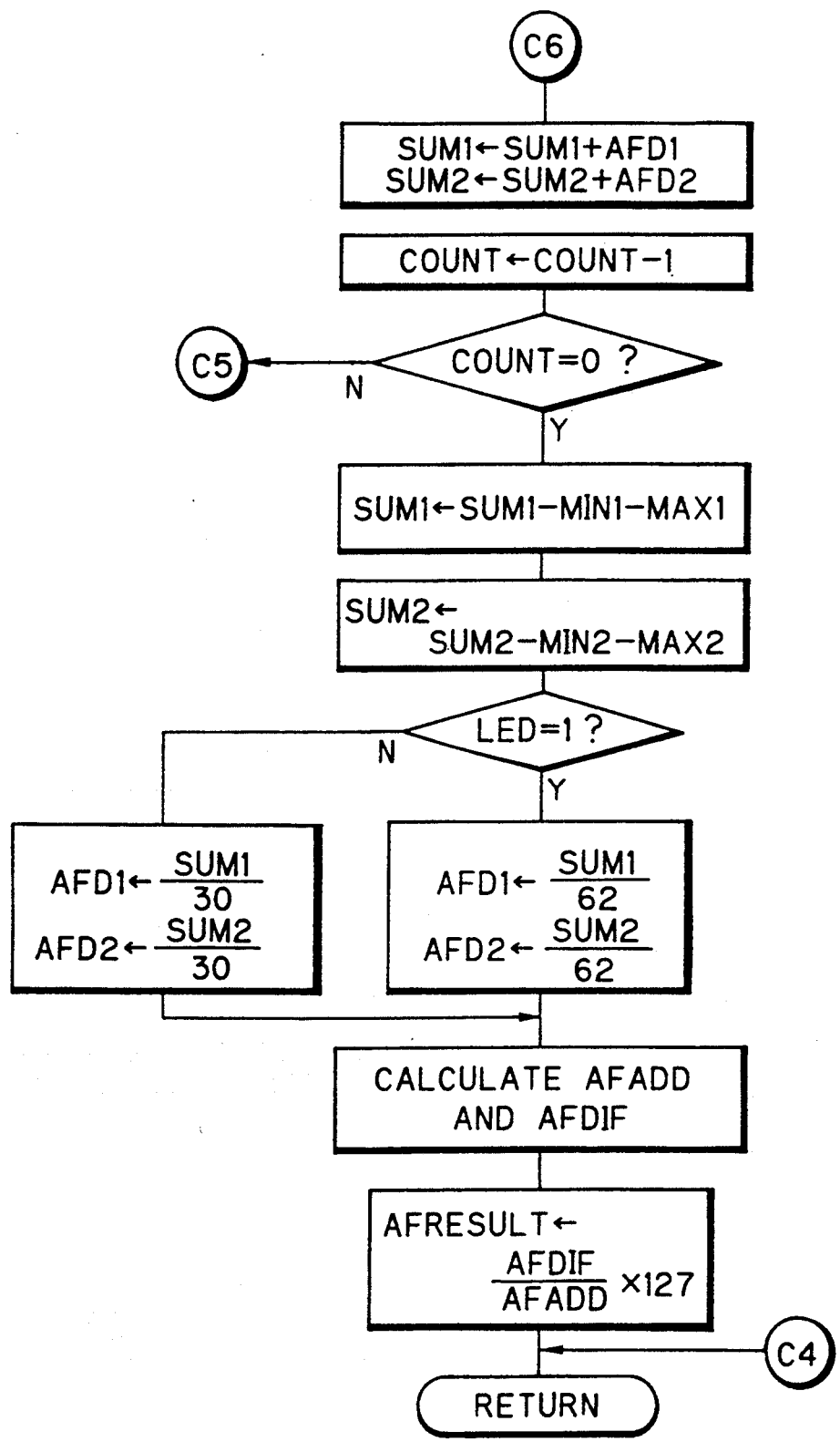
FIG. 21 is a flow chart showing the second half of the rangefinding procedure of FIG. 20.
Figure 22A:
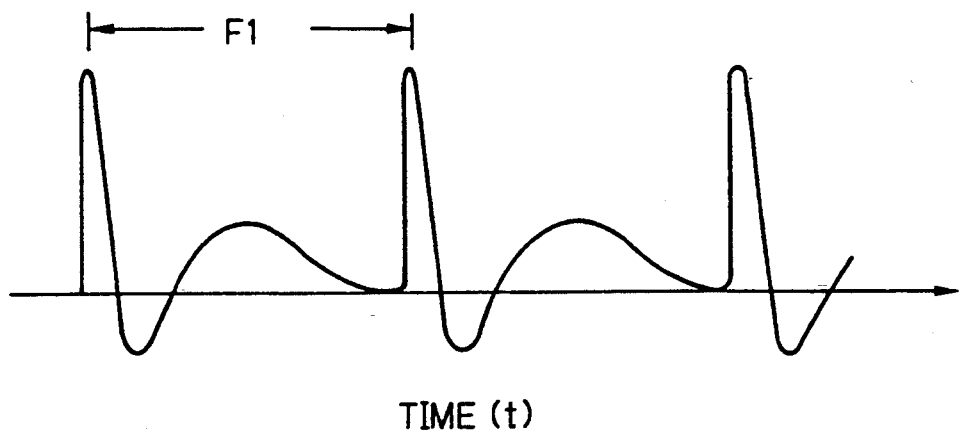
FIGS. 22A and 22B are timing charts showing the correlation between the illumination interval of a fluorescent lamp and the light projection interval of a rangefinding device.
Figure 22B:
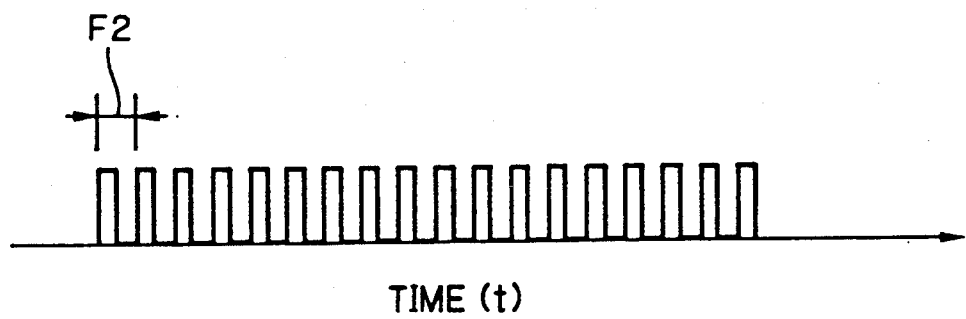

After the gain determining procedure, the rangefinding procedure is executed as illustrated in FIGS. 20 and 21. FIG. 20 is substantially similar to FIG. 16, and FIG. 21 is substantially similar to FIG. 12. In the rangefinding procedure of this embodiment, the LED 3a emits light sixty-four times to measure the distance to measurement point SP1, whereas the LEDs 3b and 3c each emit light thirty-two times to measure the distance to measurement points SP2 and SP3, respectively. The amount of measurement data for the measurement point SP1 at the central area of a photographic scene 40, having a high probability that a main object is positioned therein, is two times the amount of the measurement data for each of the measurement points SP2 and SP3 at the peripheral area. This technique is therefore effective in maintaining the measurement precision. Furthermore, the measurement time for the peripheral area of relatively lesser importance can be shortened. In this embodiment, the rangefinding time is doubled as the number of light projections is increased; however, if each light projection time is halved, the rangefinding time is kept the same as in the embodiment described previously. In order to carry out a high precision rangefinding, the number of light projections of the LEDs 3a to 3c is increased in this embodiment. The LED 3a may emit light eighteen times as in the case of the embodiment described previously. In that case, the LED 3b and LED 3c each emit light a predetermined number of times fewer than "18" e.g., nine times.

The upper limit CM for the LED 3a becomes CM=7.68, or approximately 8, by using the above formula, and CM=3.8, or about 4, for the LEDs 3*b* and 3*c*. Therefore, as the "OVMAX" for this CM, "8" is assigned to the LED 3*a*, and "4" to the LEDs 3*b* and 3*c*. In practice, preferably a larger number is assigned, for example "16" for the LED 3*a* and "8" for the LEDs 3*b* and 3*c*. As shown in FIG. 21, a different divisor is used in calculating the values AFD1 and AFD2 depending upon the number of light projections.

In the above embodiments, three LEDs 3*a*, 3*b* and 3*c* are used and three distances disposed laterally of a photographic scene are measured. Namely, the multi-beam type of rangefinder is employed. However, the embodiments other than that shown in FIGS. 18 to 21 may be applied to a single beam type of rangefinder having only one measurement point. In that case, a single LED is used to project a spot or elongated line of light toward a photographic scene. Furthermore, a single LED may be used to emit light once for rangefinding. The embodiment shown in FIGS. 18 to 21 is of the multi-beam type which is applicable to the case wherein each LED emits light a plurality of times. Instead of using a plurality of LEDs, a single LED may be used by swinging it to project light toward a plurality of different measurement points.

Furthermore, the posture of the light projector may be changed when the camera posture is changed, in order to emit a plurality of spot beams of light arranged parallel to the surface of the ground. As a light receiving element, a CCD image sensor or the like may be used. As a light source, a flash tube, a lamp or the like may be used. The various controls may be executed by logic circuits other than microcomputer.

It is also possible to omit the offset value detecting procedure or partially change the rangefinding procedure. If the power consumed upon turning the LED on and off is negligibly small, then unnecessary measured data may be disregarded during a delay time period instead of delaying the turning-on of the LED by ΔT0 after setting the gain.

In the above embodiments, the maximum value is subtracted to calculate the average value of the measurement data only when the gain is set to a high value. However, even at an earlier stage of setting, i.e., when the measurement data are read at the initial gain, one or both of the maximum and minimum values of the plurality of measurement data may be removed to calculate average values.

While the invention has been described in detail above with reference to preferred embodiments, various changes and modifications within the scope and spirit of the invention will be apparent to people skilled in this technological field. Thus, the invention should be considered as being limited only by the scope of the appended claims.

What is claimed is:

1. A method of measuring an object distance using an active-type rangefinding device comprising light projecting means, light receiving means comprising a position sensitive detector (PSD) and a first lens disposed in front of said PSD, at least one gain control amplifier, and calculating means, said method having a gain determining procedure and a rangefinding procedure, said gain determining procedure comprising the steps of:
    projecting light toward an object using said light projecting means;
    receiving light reflected from said object with said light receiving means comprising said PSD, said PSD outputting two channel currents varying as a function of a position and intensity of light incident on said PSD;
    amplifying said two channel currents output from said PSD of said light receiving means using two gain control amplifiers each amplifying a respective one of said two channel currents, said gain control amplifiers outputting two channel measurement signals;
    determining whether said signals output from said gain control amplifiers are within a predetermined range;
    adjusting the gain of said gain control amplifiers when said signals output from said gain control amplifiers are outside said predetermined range; and
    upon adjusting said gain, delaying commencement of said rangefinding procedure for a predetermined time period during which the operation of said gain control amplifier stabilizes;
    said rangefinding procedure comprising the steps of:
    sequentially performing said projecting, receiving and amplifying steps; and
    calculating a distance signal using said calculating means, said distance signal being representative of said object distance in accordance with said signals output from said gain control amplifiers.

2. The method according to claim 1, wherein said delaying is executed by delaying generation of an energizing signal for at least a predetermined time period, said energizing signal allowing the operation of said light projecting means.

3. The method according to claim 1, wherein said amplifying step further comprises the steps of:
    converting said two channel currents into voltage signals using two pre-amplifiers;
    supplying said voltage signals to said gain control amplifiers;
    converting said two channel measurement signals into digital two channel measurement data using an A/D converter; and
    supplying said measurement data to said calculating step.

4. The method according to claim 3, wherein
    said gain determining procedure comprises the steps of causing said light projecting means to emit light at least once while said gain is set to a minimum value, and determining said gain of said gain control amplifiers in accordance with the magnitude of said two channel measurement data obtained synchronously with said light emission, said gain being changed when said determined gain differs from an initial value; and
    said rangefinding procedure comprises the steps of causing said light projecting means to emit a predetermined number of times PN at said determined gain, producing PN measurement data for each channel synchronously with said PN light emissions, and calculating an average value of said PN measurement data for each channel, said distance signal being calculated by adding and subtracting said two channel average values.

5. The method according to claim 4, further comprising the step of discarding the maximum and minimum of said PN values of measurement data in calculating said average values.

6. The method according to claim 4, wherein said light projecting step is carried out by a number P of LEDs for emitting near-infrared light toward different measurement regions of a photographic scene, and a second lens disposed in front of said P LEDs, said P LEDs being disposed side by side in a row, said method of measuring an object distance being executed by sequentially activating said P LEDs to obtain P distance signals from which an optimum distance signal is selected to use in setting a taking lens.

7. The method according to claim 4 further comprising the steps of:
   monitoring said two channel measurement data during said rangefinding procedure;
   counting the number of times when one of said two channel measured data has a value outside said predetermined range; and
   when said number of times reaches a value CM, recommencing said rangefinding procedure after adjusting the gain of said two gain control amplifiers;
   wherein said CM is given by $CM \geq AT \times PN \times 120$, where AT seconds is the time between successive light projections.

8. The method according to claim 7 wherein said number of times when one of said two channel measured data is outside said proper range reaches the value CM for a second time during said recommenced rangefinding procedure, whereupon said rangefinding procedure is stopped and a distance signal is selected whose value has been determined at the current gain.

9. The method according to claims 8 further comprising a step of stopping said rangefinding sequence for a selected LED, said stopping being executed when one of said two channel measurement data obtained during said gain determining procedure for said selected LED exceeds said predetermined range and when said gain is at said initial value, said selected LED being given a distance signal representative of a nearest photographable distance.

10. The method according to claim 9, wherein one of said two channel measurement data exceeds said predetermined range during said gain determining procedure and said gain is not at said initial value, whereupon said gain determining procedure for said selected LED is recommenced after passage of 1 to 5 msec while maintaining the gain of said two gain control amplifiers at the previous gain.

11. The method according to claim 9, wherein one of said two channel measurement data exceeds said predetermined range during said gain determining procedure and said gain is not at said initial value, whereupon said gain determining procedure for said selected LED is recommenced after reducing said gain by one increment.

12. The method according to claim 9, wherein none of said two channel measured data exceeds said predetermined range during said gain determining procedure and an additive value of said measured data is less than a reference value, whereupon said gain determining procedure is recommenced using a new gain as said initial value, said new gain being obtained by adding a correction value N to the existing gain, and said value N being determined such that said value N is larger as said additive value is smaller.

13. The method according to claim 12, wherein said additive values are grouped into N ranges, and values 1, 2, ..., N−1, NM are assigned as said correction value for said additive values of said N ranges in the decreasing order of additive values.

14. The method according to claim 13, wherein said gain determining procedure is allowed to recommence a number RN of times given by $RN = (GM - IG) / NM$, where GM is a maximum gain, IG is an initial gain, and NM is a maximum value of the correction value N.

15. The method according to claim 13, wherein said gain determining procedure is recommenced a maximum number R1 of times, and if said additive value is greater than or equal to said reference value a predetermined number of times fewer than R1 (R1-R2), then the existing gain is determined as a first optimum gain at which to terminate said recommenced gain determining procedure, but if said additive value is less than said reference value even R2 times, then said recommenced gain determining procedure continues at the gain for the R2-th time to obtain (R1-R2) of said measurement data, and average values obtained from (R1-R2−1) of said measured data exclusive of maximum values are calculated for respective channels and added together to obtain a second additive value by which a second optimum gain is determined.

16. The method according to claim 15, wherein if said second additive value is greater than or equal to said reference value, then said gain for said R2-th time is set to be said second optimum gain, and if said second additive value is less than said reference value, then a value obtained by adding said gain for said R2-th time to said correction value N for said second additive value is determined as said second optimum gain.

17. The method according to claim 16, wherein if said second optimum gain exceeds said maximum gain value GM, then a distance signal representative of an infinite distance of the object is given to said LED during said gain determining procedure without executing said rangefinding procedure, and if said second optimum gain does not exceed said maximum gain value GM, then said gain determining procedure is recommenced using said second optimum gain as said initial gain.

18. The method according to claim 17, wherein said P LEDs comprise a first LED for projecting light toward the central area of a photographic scene, and second and third LEDs for projecting light toward the peripheral area of said photographic scene, light being projected from said second and third LEDs fewer times than from said first LED.

19. The method according to claim 18, wherein said maximum gain is set to a value GM1 for gain determining procedure of said first LED, and to a lesser value GM2 for said gain determining procedure of said second and third LEDs.

20. A method of measuring an object distance using an active-type rangefinding device comprising light projecting means, light receiving means, at least one gain control amplifier, means for changing a gain of said gain control amplifier, and calculating means, said method having a gain determining procedure and a rangefinding procedure, said gain determining procedure comprising the steps of:
   projecting light from said light projecting means a number PN of times at a light projection interval of AT seconds during a rangefinding procedure;
   receiving light reflected from said object using said light receiving means;
   amplifying a first signal output from said light receiving means;
   monitoring a second signal output from said gain control amplifier;

adjusting the gain of said gain control amplifier when said second output signal exceeds a predetermined level range a number CM of times;

wherein said CM is given by $CM \geq AT \times PN \times 120$;

said rangefinding procedure comprising the steps of:

sequentially performing said projecting, receiving, and amplifying steps; and calculating a distance signal representative of said object distance using said calculating means in accordance with said second signal output from said gain control amplifier;

said rangefinding procedure being executed only after the gain of said gain control amplifiers has been adjusted.

21. A method of measuring an object distance under fluorescent lamp illumination conditions using an active-type rangefinding device comprising light projecting means, light receiving means, at least one gain control amplifier, and calculating means, said method comprising the steps of:

projecting light toward an object using said light projecting means;

receiving light reflected from said object on said light receiving means;

amplifying a first signal output from said light receiving means using said at least one gain control amplifier;

calculating a distance signal representative of said object distance using said calculating means in accordance with a second signal output from said gain control amplifier;

if said second output signal exceeds a predetermined level, reading said second output signal at a same gain after passage of 1 to 5 msec; and if said second output signal as read again above continues to exceed said predetermined level, terminating calculation of said distance signal based on said second output signal.

22. A method of measuring an object distance using an active-type rangefinding device comprising light projecting means, light receiving means, at least one gain control amplifier, gain adjusting means, and calculating means, said method having a gain determining procedure and a rangefinding procedure and comprising the steps of:

projecting light toward an object during said gain determining procedure and rangefinding procedure using said light projecting means;

receiving light reflected from said object using said light receiving means;

amplifying a signal output from said light receiving means using said at least one gain control amplifier;

setting an optimum gain of said gain control amplifier using said gain adjusting means during said gain determining procedure within a range from an initial gain IG to a maximum gain GM;

calculating, with said calculating means, a distance signal representative of said object distance in accordance with a signal output from said gain control amplifier set to said optimum gain during said rangefinding procedure;

when the signal output from said gain control amplifier is less than a predetermined level during said gain determining procedure, recommencing said gain determining procedure after changing to a new gain, said new gain being said initial gain IG increased by a correction value N corresponding to the level of said signal, said correction values being grouped in a plurality of ranges in accordance with said level a maximum correction value NM being provided for the lowest level, and the correction value N becoming smaller as the level increases; and determining the number of times RN that said gain determining procedure is allowed to recommence, according to the equation $RN - (GM - IG) / NM$.

23. The method according to claim 22, wherein the output signal levels of said gain control amplifier are grouped into N ranges, and values $1, 2, \ldots, N-1, NM$ are assigned as said correction value for said output signal levels of said N ranges in decreasing order of output signal levels.

24. A method of measuring an object distance using an active-type rangefinding device comprising light projecting means, light receiving means, at least one gain control amplifier, and calculating means, said method having a gain determining procedure followed by a rangefinding procedure, said gain determining procedure comprising the steps of:

projecting light toward an object using said light projecting means;

receiving light reflected from said object using said light receiving means and outputting a first signal from at least one channel;

amplifying said first signal using said at least one gain control amplifier and outputting a second signal;

judging whether said second signal reaches a saturated level while said gain control amplifier is set to a minimum gain;

if said second signal is at said saturated level, setting a distance signal corresponding to a nearest photographable distance, and not performing said rangefinding procedure;

if said second signal is less than said saturated level, projecting light a number N of times to obtain N of said second signals;

generating an average value of said N second signals; and determining the gain of said gain control amplifier in accordance with said average value;

said rangefinding procedure comprising the steps of:

if said distance signal has not been set and the gain of said gain control amplifier has been determined, sequentially performing said projecting, receiving, and amplifying steps, and further calculating a distance signal using said calculating means, said distance signal being representative of said object distance in accordance with said second signal output from said gain control amplifier.

25. A method of measuring an object distance using an active-type rangefinding device comprising light projecting means, light receiving means, at least one gain control amplifier, and calculating means, said method having a gain determining procedure followed by a rangefinding procedure, said gain determining procedure comprising the steps of:

projecting light toward an object using said light projecting means;

receiving light reflected from said object using said light receiving means and outputting a first signal from at least one channel;

amplifying said first signal using said at least one gain control amplifier and outputting a second signal;

generating a plurality of said second signals from said gain control amplifier while changing the gain of said gain control amplifier;

calculating an average value of said plurality of said second signals from said second signals exclusive of a maximum value and/or a minimum value; and determining said gain using said average value as an evaluation criterion;

said rangefinding procedure comprising the steps of:

sequentially performing said projecting, receiving, and amplifying steps; and calculating a distance signal using said calculating means, said distance signal being representative of said object distance in accordance with said second signal output from said gain control amplifier.

26. A method of measuring a distance of an object using an active-type rangefinding device comprising light projecting means, light receiving means, at least one gain control amplifier, calculating means, and optimum distance selecting means, said method having a gain determining procedure followed by a rangefinding procedure, said gain determining procedure comprising the steps of:

projecting light, using said light projecting means, to a plurality of measurement regions at the central and peripheral areas of a photographic scene;

receiving light, using said light receiving means, reflected from each measurement region during light projection;

determining an optimum gain for each said region within a predetermined range from a minimum gain to a maximum gain; and setting a gain value GM1 as said maximum gain for the measurement region at the central area of said photographic scene, and a gain value GM2 as said maximum gain for the measurement region at the peripheral area of said photographic scene, GM2 being less than GM1;

said rangefinding procedure comprising the steps of:

projecting light, using said light projecting means, to a plurality of measurement regions at the central and peripheral areas of a photographic scene;

receiving light, using said light receiving means, reflected from each measurement region during light projection and outputting a first signal from at least one channel;

amplifying said first signal using said at least one gain control amplifier and outputting a second signal;

calculating, using said calculating means, a distance signal for each measurement region based on said second signal output from said gain control amplifier;

selecting an optimum distance signal, using said optimum distance selecting means, from a plurality of said distance signals.

27. The method according to claim 26, wherein said plurality of measurement regions comprises three measurement regions, and said light projecting means comprises three LEDs corresponding to said three measurement regions, said LEDs being arranged side by side in a row.

* * * * *